United States Patent
Nakano et al.

(10) Patent No.: US 11,216,300 B2
(45) Date of Patent: Jan. 4, 2022

(54) DATACENTER, COMMUNICATION APPARATUS, COMMUNICATION METHOD, AND COMMUNICATION CONTROL METHOD IN A COMMUNICATION SYSTEM

(71) Applicant: NEC CORPORATION, Tokyo (JP)

(72) Inventors: Shintaro Nakano, Tokyo (JP); Hideo Hasegawa, Tokyo (JP); Satoru Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/555,365

(22) PCT Filed: Mar. 3, 2016

(86) PCT No.: PCT/JP2016/001167
§ 371 (c)(1),
(2) Date: Sep. 1, 2017

(87) PCT Pub. No.: WO2016/139949
PCT Pub. Date: Sep. 9, 2016

(65) Prior Publication Data
US 2018/0039511 A1 Feb. 8, 2018

(30) Foreign Application Priority Data
Mar. 4, 2015 (JP) .............................. JP2015-042270

(51) Int. Cl.
*H04W 28/10* (2009.01)
*G06F 9/48* (2006.01)
(Continued)

(52) U.S. Cl.
CPC ............ *G06F 9/4856* (2013.01); *G06F 9/455* (2013.01); *H04L 12/4641* (2013.01);
(Continued)

(58) Field of Classification Search
None
See application file for complete search history.

(56) References Cited

U.S. PATENT DOCUMENTS 9,787,559 B1 * 10/2017 Schroeder ........... H04L 41/5038
2011/0283017 A1    11/2011 Alkhatib et al.
(Continued)

FOREIGN PATENT DOCUMENTS

JP    2009-135662 A    6/2009
JP    2012-165199 A    8/2012
(Continued)

OTHER PUBLICATIONS

International Search Report for PCT/JP2016/001167 dated May 17, 2016.
(Continued)

*Primary Examiner* — Jenkey Van
(74) *Attorney, Agent, or Firm* — Sughrue Mion, PLLC

(57) ABSTRACT

A datacenter, a communication apparatus, a communication method, and a communication control method in a communication system are provided that can enhance the versatility of a datacenter and a virtual network constructed therein. A communication system includes: a communication facility owned by at least one network operator; and a datacenter connected to the communication facility over a network, wherein the datacenter includes: a first virtual network that implements mobile communication functions by using the communication facility; a second virtual network that provides a cloud service; and a communication means, wherein the communication means includes: a reception means for receiving traffic from the communication facility; and a distributing means for distributing the received traffic to either the first virtual network or the second virtual network.

18 Claims, 19 Drawing Sheets

(51) Int. Cl.
*H04L 12/803* (2013.01)
*H04L 12/715* (2013.01)
*G06F 9/455* (2018.01)
*H04L 12/46* (2006.01)
*H04L 12/721* (2013.01)
*H04L 12/713* (2013.01)

(52) U.S. Cl.
CPC .......... *H04L 45/566* (2013.01); *H04L 45/586* (2013.01); *H04L 45/64* (2013.01); *H04L 47/125* (2013.01)

(56) References Cited

U.S. PATENT DOCUMENTS

| | | | |
|---|---|---|---|
| 2011/0314155 A1 | 12/2011 | Narayanaswamy et al. | |
| 2012/0287781 A1* | 11/2012 | Maria | H04W 92/02 370/229 |
| 2013/0121207 A1* | 5/2013 | Parker | H04L 67/10 370/254 |
| 2013/0142201 A1* | 6/2013 | Kim | H04L 12/4645 370/392 |
| 2013/0287022 A1* | 10/2013 | Banavalikar | H04L 29/06829 370/389 |
| 2015/0381493 A1* | 12/2015 | Bansal | H04L 45/30 370/392 |
| 2016/0021539 A1* | 1/2016 | Piscopo, Jr | H04L 65/1006 455/411 |
| 2017/0086056 A1* | 3/2017 | Cao | H04W 8/18 |

FOREIGN PATENT DOCUMENTS

| | | |
|---|---|---|
| JP | 2013-527532 A | 6/2013 |
| JP | 2015-032932 A | 2/2015 |
| WO | 2014109086 A1 | 7/2014 |
| WO | 2014/136058 A1 | 9/2014 |
| WO | 2014141593 A1 | 9/2014 |

OTHER PUBLICATIONS

Communication dated Sep. 3, 2019 from the Japanese Patent Office in counterpart application No. 2018-174478.

ETSI TS 123 251, Jan. 2013, pp. 2-30, V10.5.0.

Takashi Hiromatsu, All of the findings of SDN/NFV, Nikkei BP, Dec. 12, 2014, p. 161.

Hitachi Hyoron; Hitachi Hyoronsha; Information System Innovation created by Cloud Computing; Jul. 1, 2009, pp. 34-37, vol. 91, No. 7.

NTT Communications, planning further development on value of a network which enhances convenience of carrier cloud, Business Communication Co., Ltd, Jun. 1, 2014, pp. 60-61, vol. 51, No. 6.

* cited by examiner

FIRST EXEMPLARY EMBODIMENT

SIXTH EXAMPLE

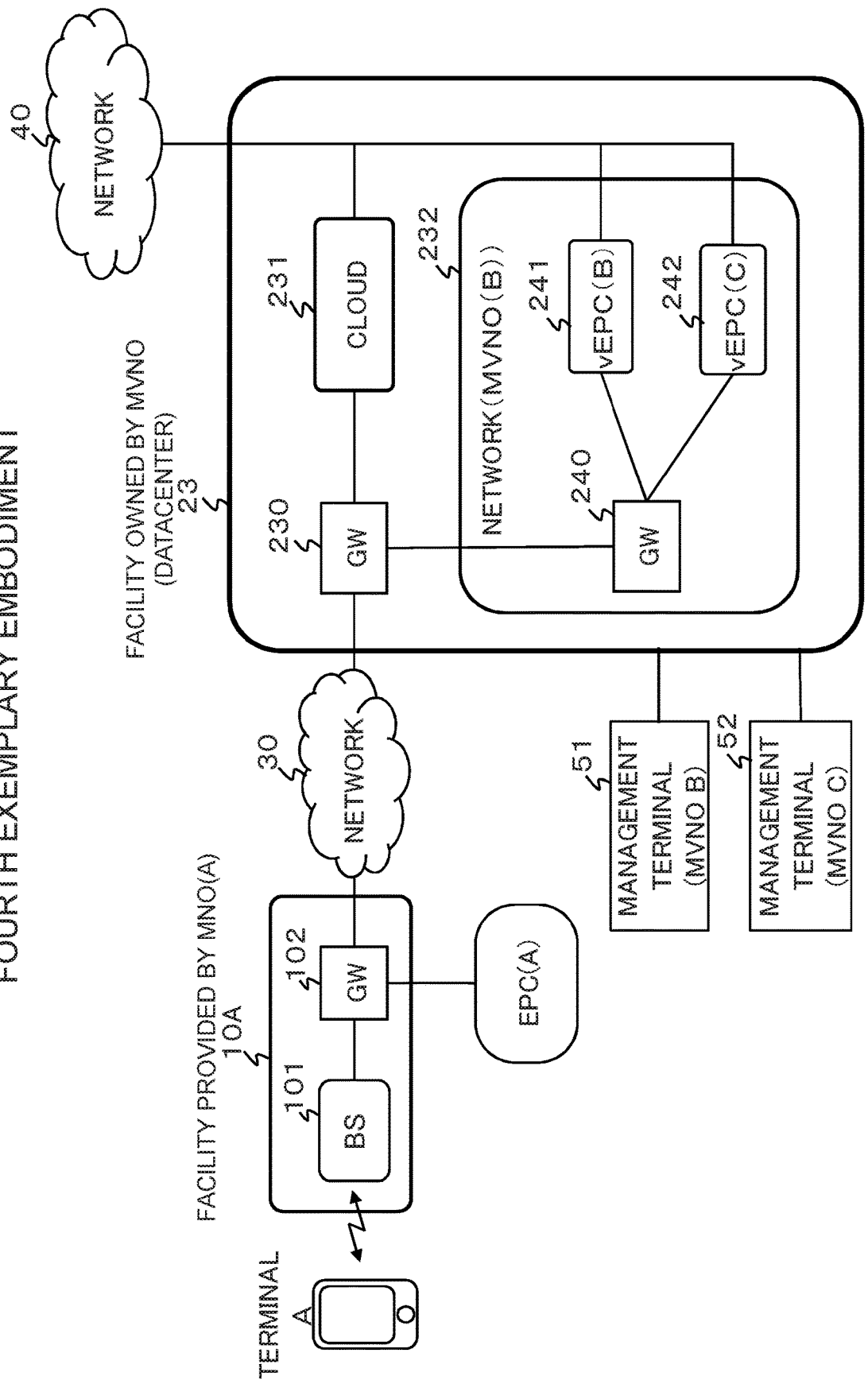

DATACENTER, COMMUNICATION APPARATUS, COMMUNICATION METHOD, AND COMMUNICATION CONTROL METHOD IN A COMMUNICATION SYSTEM

CROSS REFERENCE TO RELATED APPLICATIONS

This application is a National Stage of International Application No. PCT/JP2016/001167 filed Mar. 3, 2016, claiming priority based on Japanese Patent Application No. 2015-042270 filed Mar. 4, 2015, the contents of all of which are incorporated herein by reference in their entirety.

TECHNICAL FIELD

The present invention relates to a communication system including a datacenter, and more particularly to a communication technique and a communication control technique for the same.

BACKGROUND ART

In recent years, various services such as cloud services are provided by many mobile virtual network operators (MVNO: Mobile Virtual Network Operator). In general, an MVNO does not own a wireless communication facility and therefore, in many cases, leases an access network and a core network from a mobile network operator (MNO: Mobile Network Operator). For example, an MVNO leases base stations and a core network EPC (Evolved Packet Core) owned by an MNO and provides services to users' mobile terminals via the Internet as shown in FIG. 1 (for example, see PTL 1).

CITATION LIST

Patent Literature

[PTL 1]
International Publication No. WO2014/136058

SUMMARY

Technical Problem

MNOs have been promoting network functions virtualization (NFV: Network Functions Virtualization) and software-defined networking (SDN: Software-Defined Networking) in order to cope with increasing facilities and operation costs along with a recent increase in traffic volume. In such SDN/NFV environments, the virtualization of a core network has also been advanced, and it is conceivable that a virtual EPC (vEPC: virtual EPC) will be constructed within, for example, a datacenter of a cloud provider in the future.

If a virtual network is constructed within a datacenter, since an MVNO does not own a wireless communication infrastructure as described above, the MVNO needs to use an existing MNO's access network to be accessed from a terminal. If a plurality of MNOs own their respective access networks in particular, it is preferable that a virtual network within a datacenter be shared among the plurality of access networks.

Moreover, if an MVNO is a cloud provider, it is necessary that its cloud computing and a carrier's core network coexist within the cloud provider's own datacenter. Accordingly, traffic from cloud users and the carrier's traffic are accommodated concurrently, which brings about a problem of segregation between the cloud computing and the core network.

Accordingly, an object of the present invention is to provide a datacenter, a communication apparatus, a communication method, and a communication control method in a communication system that enable the efficient use of a datacenter and a virtual network constructed within the datacenter.

Solution to Problem

A communication system according to the present invention is characterized by including: a communication facility owned by at least one network operator; and a datacenter connected to the communication facility over a network, wherein the datacenter includes: a plurality of virtual networks operated by a plurality of different virtual network operators, respectively; and a communication means, wherein the communication means includes: a reception means for receiving traffic from the communication facility; and a distributing means for distributing the received traffic to any one of the virtual networks.

A datacenter according to the present invention is characterized by including: a gateway means for connecting to a communication facility owned by a network operator over a network; a plurality of virtual networks operated by a plurality of different virtual network operators, respectively; and a distributing means for distributing traffic received from the communication facility to any one of the virtual networks.

A communication apparatus according to the present invention is a communication apparatus within a datacenter connected to a communication facility owned by at least one network operator over a network, characterized by including: a reception means for receiving traffic from the communication facility; and a distributing means for distributing the traffic from the communication facility to any one of a plurality of virtual networks operated by a plurality of different virtual network operators, respectively.

A communication method according to the present invention is characterized by including: by a network operator, owning a communication facility; within a datacenter, constructing a plurality of virtual networks operated by a plurality of different virtual network operators, respectively; and by a distributing means within the datacenter, distributing traffic from the communication facility to any one of the virtual networks.

A communication control method according to the present invention is a communication control method in a datacenter and is characterized by including: by a gateway means, connecting to a communication facility owned by a network operator over a network; by a computing resource, constructing a plurality of virtual networks operated by a plurality of different virtual network operators, respectively; and by a distributing means, distributing traffic from the communication facility to any one of the virtual networks.

Advantageous Effects of Invention

As described above, according to the present invention, a plurality of virtual networks that are operated by a plurality of different virtual communication operators are constructed within a datacenter, in which traffic from a communication facility is distributed to one of the plurality of virtual networks, whereby it is possible to enhance the versatility of the datacenter and the virtual network constructed within it, and thus to achieve the efficient use of the virtual network.

BRIEF DESCRIPTION OF DRAWINGS

FIG. 19 is a network diagram showing the schematic architecture of a communication system according to a fourth exemplary embodiment of the present invention.

DETAILED DESCRIPTION

Outline of Exemplary Embodiments

In communication systems according to exemplary embodiments of the present invention, a mobile virtual network operator (hereinafter, abbreviated as MVNO) constructs a virtual core network within a datacenter of its own, and implements mobile communication network functions by using wireless communication facilities owned by mobile network operators (hereinafter, abbreviated as MNO).

In a datacenter according to an exemplary embodiment of the present invention, a virtual core network constructed within it can process traffic from a plurality of MNOs' wireless communication facilities. Moreover, in a datacenter according to another exemplary embodiment of the present invention, a virtual core network and another virtual network that provides a cloud service are independently constructed, and traffic is distributed such that traffic from a plurality of MNOs' wireless communication facilities is transferred to the virtual core network, and traffic from users who use the cloud service is transferred to the other virtual network. A datacenter according to further another exemplary embodiment of the present invention includes a plurality of virtual networks of different MVNO operators which are constructed independently of each other within the datacenter, in which traffic from a subscriber of each MVNO operator is distributed to a corresponding virtual network. Hereinafter, exemplary embodiments and examples of the present invention will be described in detail with reference to drawings.

1. First Exemplary Embodiment

According to a first exemplary embodiment of the present invention, a virtual core network is constructed within a datacenter, and the virtual core network within the datacenter performs communication control to process traffic from wireless communication facilities provided by a plurality of MNOs, allowing the versatility of the virtual core network to be enhanced.

1.1) System

Figure 1:
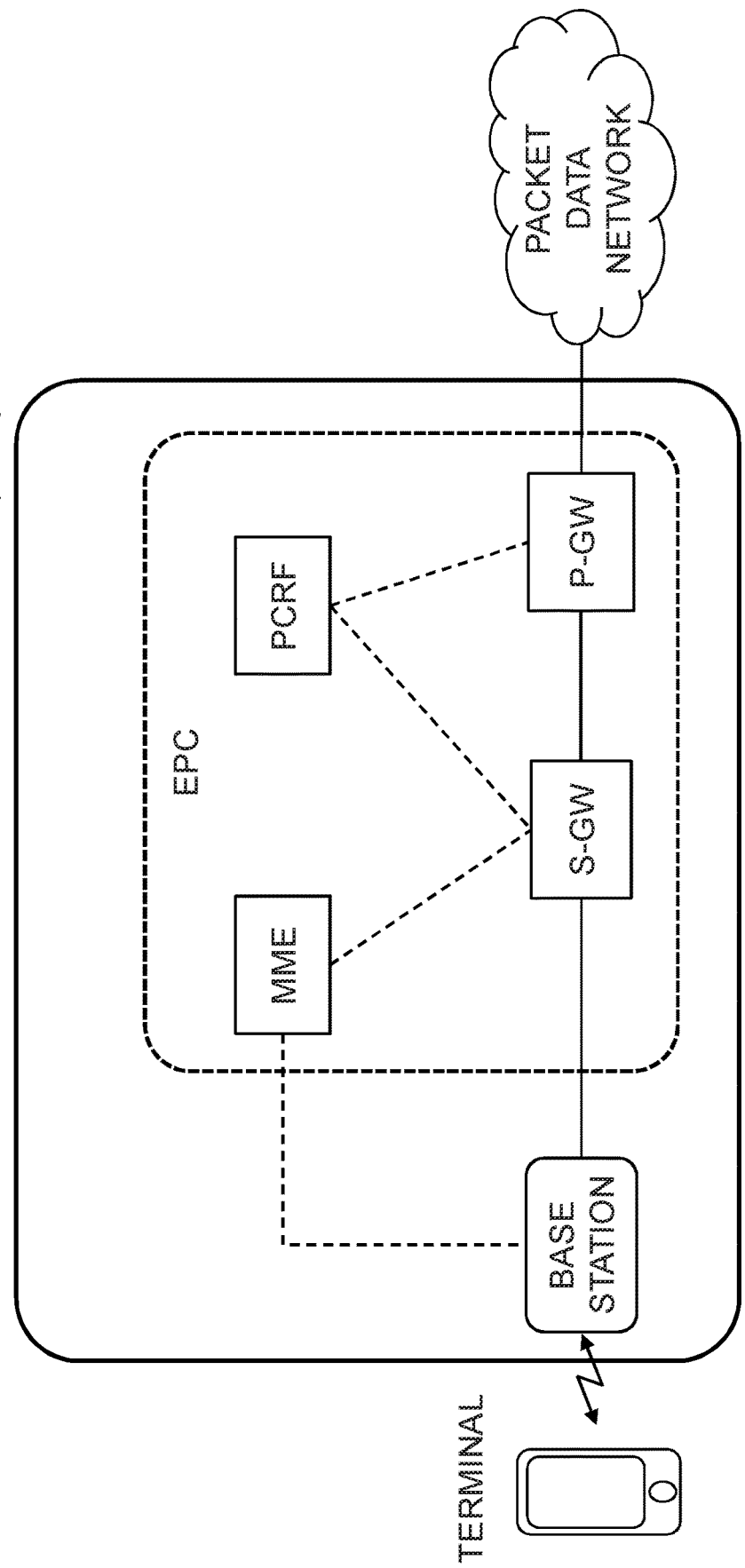
FIG. 1 is a block diagram showing an example of a wireless communication facility owned by an existing mobile network operator.
Figure 2:
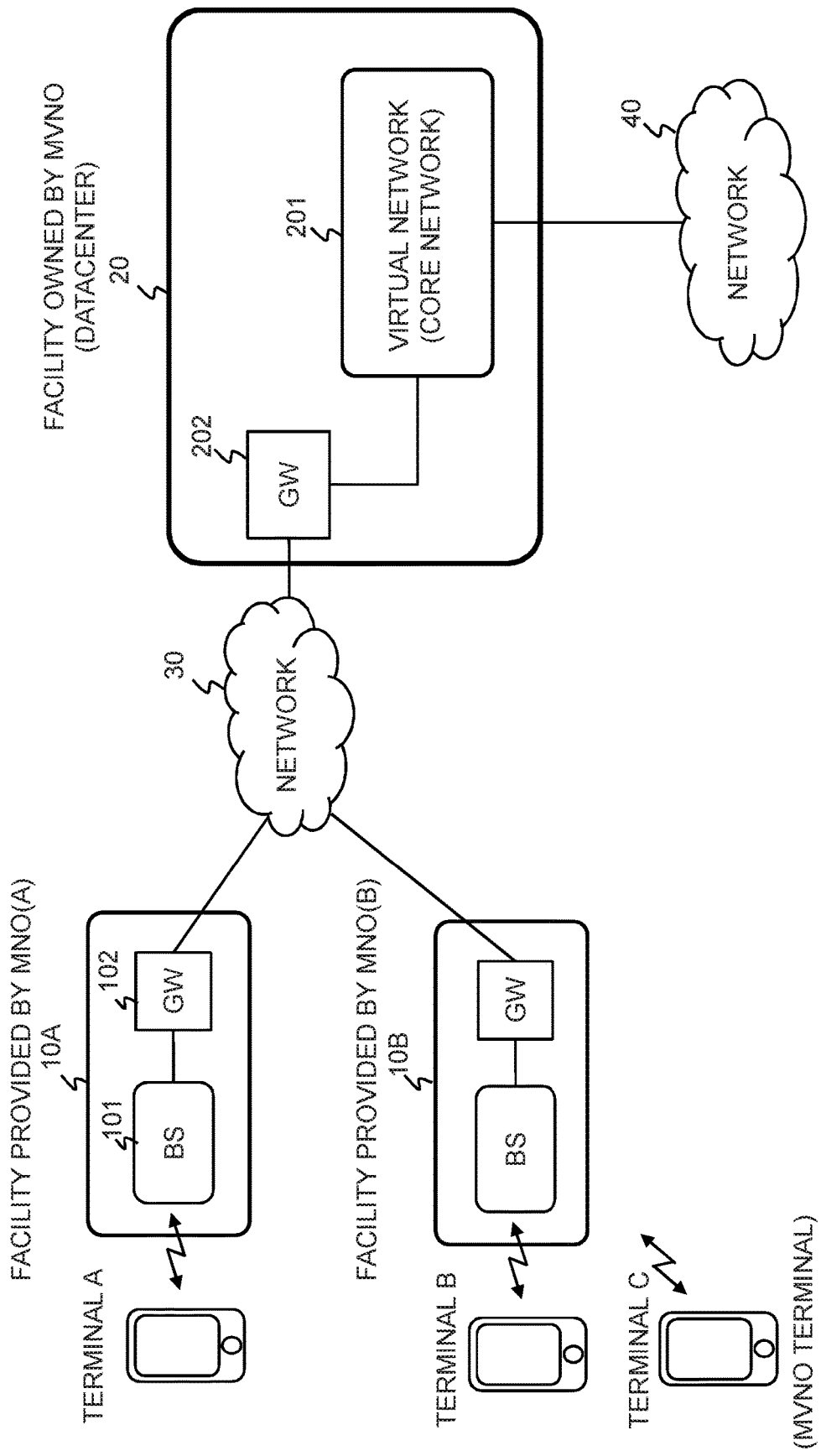
FIG. 2 is a network diagram showing the schematic architecture of a communication system according to a first exemplary embodiment of the present invention.

As illustrated in FIG. 2, a communication system according to the present exemplary embodiment includes a plurality of wireless communication facilities (10A, 10B), a datacenter 20, and a network 30 connecting the plurality of wireless communication facilities and the datacenter 20. In FIG. 2, it is assumed that different MNO(A) and MNO(B) own the wireless communication facilities 10A and 10B, respectively, and that an MVNO owns the datacenter 20.

The wireless communication facility 10A is part of the access network of a mobile communication network owned by the MNO(A) and is assumed to include at least a base station 101 and a gateway 102. Although one base station 101 is depicted here, an access network may be constructed including a plurality of base stations 101 (e.g., eUTRAN (Evolved Universal Terrestrial Radio Network)). Note that if the MNO(A) owns a core network, it is assumed that access from a terminal A does not pass through the core network of the MNO(A) by the gateway 102 offloading the MNO(A). The base station 101 performs wireless communication with the terminal A of a subscriber to the MNO(A). The gateway 102 connects to the datacenter 20 via the network 30. It is assumed that the wireless communication facility 10B basically has a similar configuration. Moreover, the MVNO's subscriber terminal (a terminal C) can also connect to the datacenter 20 via the network 30 by using the wireless communication facility of an MNO.

The datacenter 20 has a computing resource such as a computer, constructing a virtual network 201, which implements core network functions, and a gateway 202, which connects to the network 30. Preferably, the gateway 202 forms a dedicated physical channel, or a protected logical channel passing over the network 30, with the gateway 102 of each wireless communication facility. Thereby, the base station of each wireless communication facility and the virtual network 201 can be connected, and the virtual network 201 is thus able to accommodate the radio access networks of the different MNOs. Note that the virtual network 201 can be constructed by using resources which are, for example, a virtual machine, a switch, a router and the like configured on a physical server.

The network 30 is an IP network such as the Internet, a RAN (Radio Access Network), dedicated lines physically isolated from other networks, or the like that connects the wireless communication facilities 10A, 10B and other wireless communication facilities to the datacenter 20. Moreover, a network 40, which is connected to the virtual network 201, is an external packet network or an IP Network such as the Internet.

1.2) Datacenter

Next, a description will be given of the datacenter 20 in which the radio access networks of the different MNOs are accommodated in the virtual network 201. However, blocks having similar functions to those of the communication system shown in FIG. 2 are denoted by the same reference signs, and a detailed description thereof will be omitted.

First Example

Figure 3:
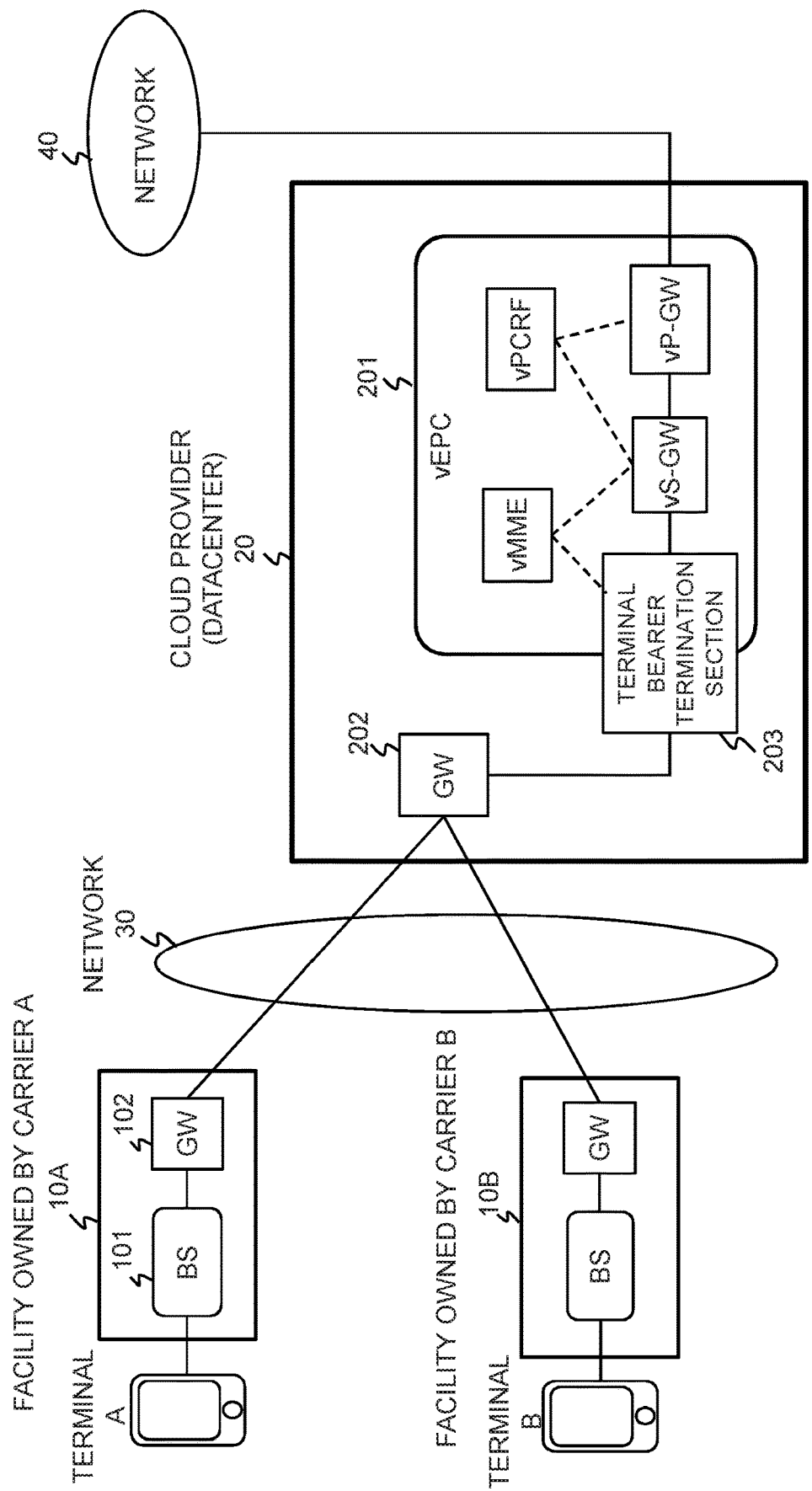
FIG. 3 is a network diagram showing the schematic architecture of a communication system according to a first example of the present invention.

As illustrated in FIG. 3, in a communication system according to a first example of the present invention, the virtual core network (vEPC) 201 is constructed within the datacenter 20 of the cloud provider (MVNO), and a terminal bearer termination section 203 for terminating a bearer of each terminal is provided at the front stage of the vEPC 201, that is, between an S-GW in the vEPC 201 and the gateway 202.

The vEPC 201 is implemented by, for example, a virtual machine on a server within the datacenter 20, per appliance or per individual function included in each appliance. The following are examples of such functions.

HSS (Home Subscriber Server):
  Function of managing subscriber information in the communication system. RADIUS (Remote Authorization Dial In Service):
    Function of authenticating a user accessing the network (Authentication Function)
    Function of giving access authorization to an authenticated user (Authorization Function)
    Function of monitoring access for accounting management (Accounting Function)
P-GW:
  Function of processing packets (User-Plane Function)
  Function of managing charging status depending on communication (PCEF: Policy and Charging Enforcement Function)
  Function of controlling policies such as QoS (Quality of Service) (PCRF: Policy and Charging Rule Function)
  LI Function
S-GW:
  Function of processing packets (User-Plane Function)
  Function of processing control signaling (C-Plane Function) MME (Mobility Management Entity):
  Function of processing control signaling (C-Plane Function): for example, setup/release of a session for communication, handover control, and the like
  Function of managing subscriber information in the communication system in cooperation with HSS (Home Subscriber Server)

For example, the terminal A (the same applies to the terminals B and C) can access the Internet 40 via the vEPC 201 constructed within the datacenter 20 of the cloud provider by wirelessly connecting to the base station 101 of the carrier A (MNO(A)) to which this terminal subscribes. In case of EPS (Evolved Packet System) using E-UTRAN, the terminal A establishes a bearer (virtual path) with the vEPC 201 via the base station (eNodeB) 101 it has connected to. However, in the present example, the bearer is terminated between the terminal A and the terminal bearer termination section 203 disposed at the front stage of the vEPC 201, whereby the traffic with the terminal is protected end-to-end. Since a bearer is provided by encapsulating a packet, the terminal bearer termination section 203 can identify the access network of each carrier from the outer header of a packet. Hereinafter, operation in the first example will be described with reference to FIG. 4.

Figure 4:
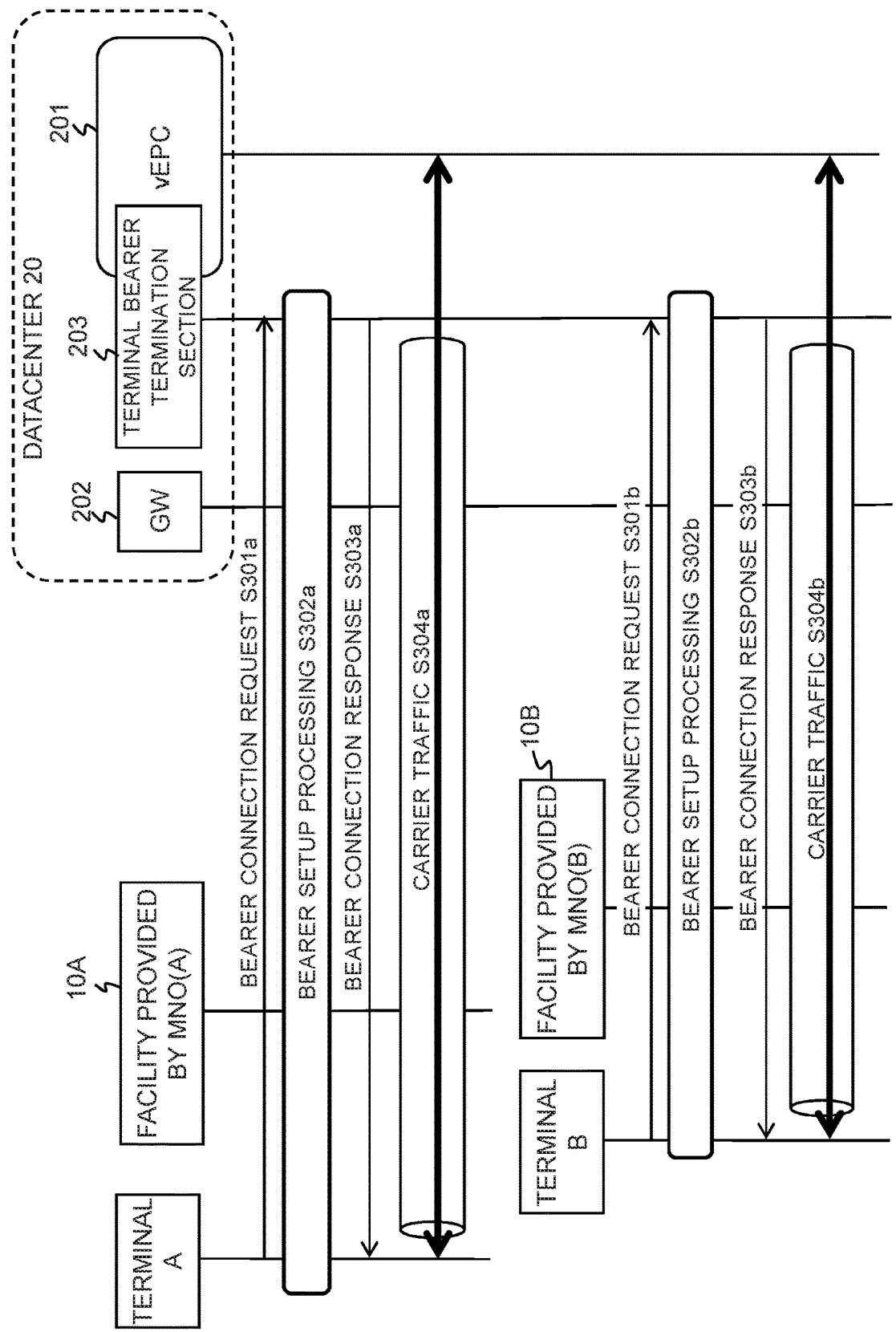
FIG. 4 is a sequence chart showing an example of operation in the communication system according to the first example.

Referring to FIG. 4, when the terminal A sends a bearer connection request to the vEPC 201 within the datacenter 20 via the facility (base station and GW) provided by the carrier A (MNO(A)) it subscribes to (Operation S301*a*), the terminal bearer termination section 203 provided at the front stage of the vEPC 201 terminates the request, and bearer setup processing is performed between the terminal A and the terminal bearer termination section 203 (Operation S302*a*). When a bearer connection response is sent from the terminal bearer termination section 203 to the terminal A (Operation S303*a*), a bearer is established between the terminal A and the terminal bearer termination section 203, and prescribed signals are exchanged between the terminal A and the vEPC 201 through this bearer (Operation S304*a*). Similarly, the terminal B sends a bearer connection request via the facility (base station and GW) provided by the carrier B (MNO(B)) it subscribes to (Operation S301*b*); bearer setup processing is performed between the terminal B and the terminal bearer termination section 203 (Operation S302*b*); a bearer connection response is sent from the terminal bearer termination section 203 (Operation S303*a*); prescribed signals are exchanged between the terminal B and the vEPC 201 through the bearer between the terminal B and the terminal bearer termination section 203 (Operation S304*b*). In this manner, the terminal bearer termination section 203 can identify a bearer with each terminal subscribing to each carrier, and each carrier traffic is protected by means of a setup bearer.

Note that the terminal bearer termination section 203 may be provided within the gateway 202 or the vEPC 201.

Second Example

Figure 5:
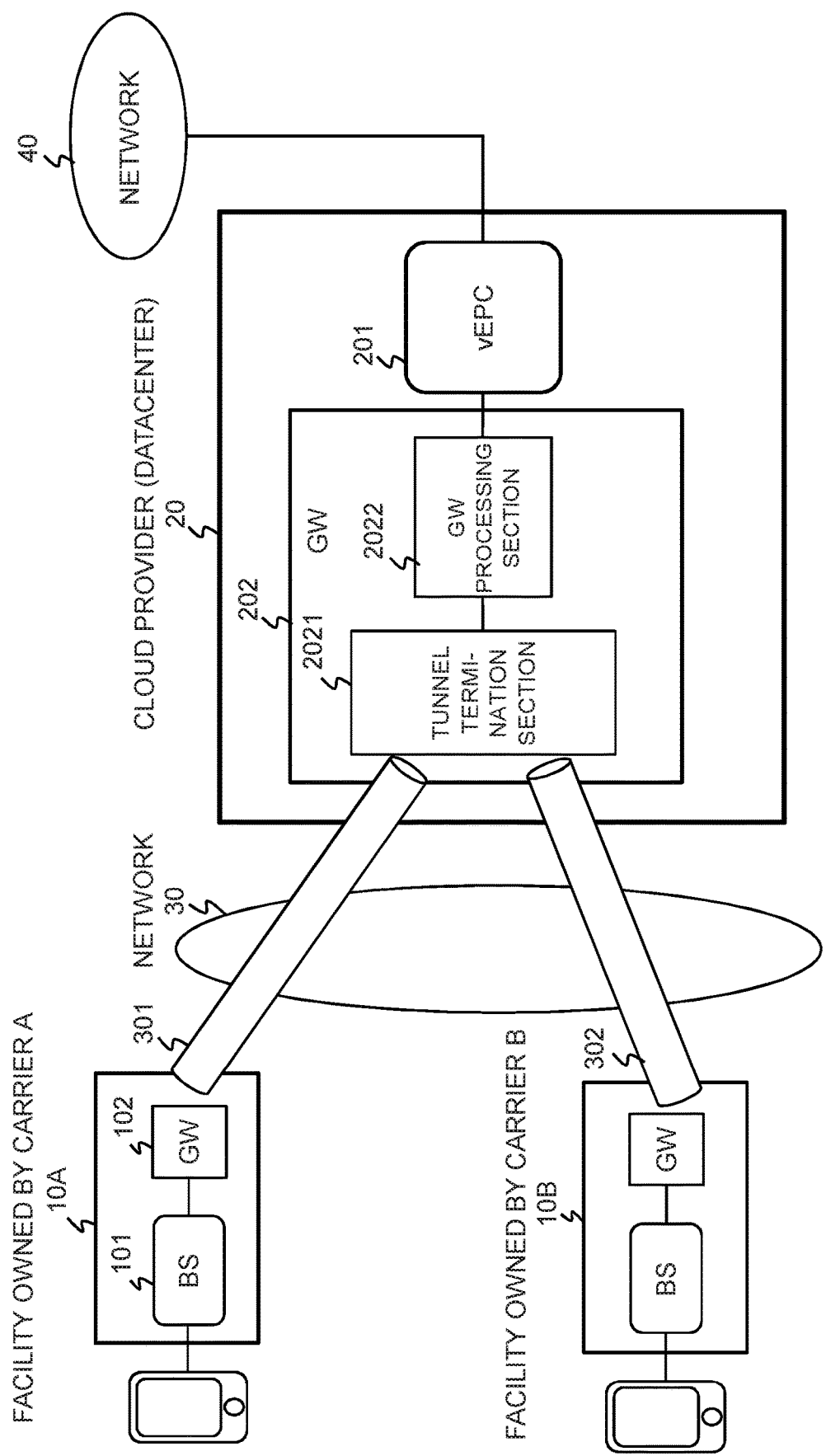
FIG. 5 is a network diagram showing the schematic architecture of a communication system according to a second example of the present invention.

As illustrated in FIG. 5, in a communication system according to a second example of the present invention, the virtual core network (vEPC) 201 is constructed within the datacenter 20 of the cloud provider (MVNO), and further provided is a function of terminating a virtual path (tunnel) set up over the network 30 with the facility owned by each carrier. According to the present example, a tunnel termination section 2021 and a gateway processing section 2022 are provided to the gateway 202.

The tunnel termination section 2021 terminates a tunnel 301 between itself and the wireless communication facility 10A owned by the carrier A and a tunnel 302 between itself and the wireless communication facility 10B owned by the carrier B individually. Note that if there is another wireless communication facility owned by the cloud provider, the tunnel termination section 2021 may terminate a tunnel between itself and that wireless communication facility.

Accordingly, the gateway processing section 2022 can identify a packet from each radio access network and forward them to the vEPC 201. In this manner, traffic with a terminal is protected by means of a tunnel. Note that the vEPC 201 is as described in the first example.

Third Example

Figure 6:
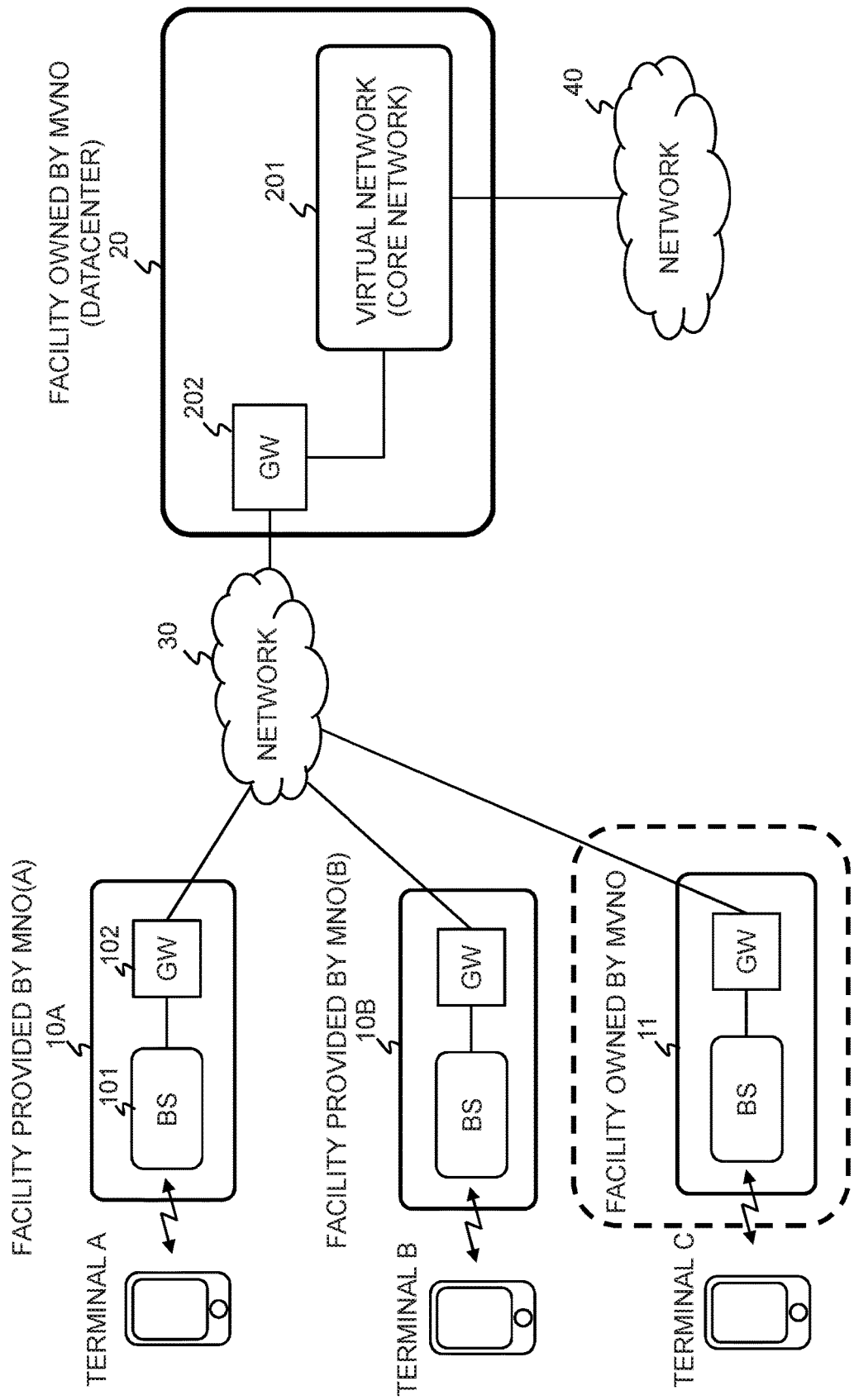
FIG. 6 is a network diagram showing the schematic architecture of a communication system according to a third example of the present invention.

As illustrated in FIG. 6, the cloud provider (MVNO) owning the datacenter 20 may own a wireless facility 11 such as a base station. For example, the facility owned by the MVNO includes a base station and a gateway GW, similarly to the facility 10A or 10B provided by an MNO. The terminal C subscribing to the MVNO can access the datacenter 20 via the wireless facility 11. Note that the third example can be combined with the above-described first or second example. That is, the terminal bearer termination section 203 may be provided at the front stage of the virtual network 201 as in the first example, or the tunnel termination section 2021 may be provided to the GW 202 as in the second example.

1.3) Effects

As described above, according to the first exemplary embodiment of the present invention, a virtual core network constructed within a datacenter can identifiably process traffic from radio access facilities provided by a plurality of MNOs. Accordingly, it is possible to implement the highly versatile datacenter supporting the radio access networks of the different MNOs and thus to achieve the efficient use of the virtual core network.

2. Second Exemplary Embodiment

According to a second exemplary embodiment of the present invention, a virtual core network for a carrier and a virtual network for providing a cloud service to users are independently constructed within a datacenter. Further, a distributing means is provided within the datacenter to divide and distribute traffic to either the virtual core network or the virtual network, whereby the versatility of the datacenter is enhanced.

2.1) System

Figure 7:
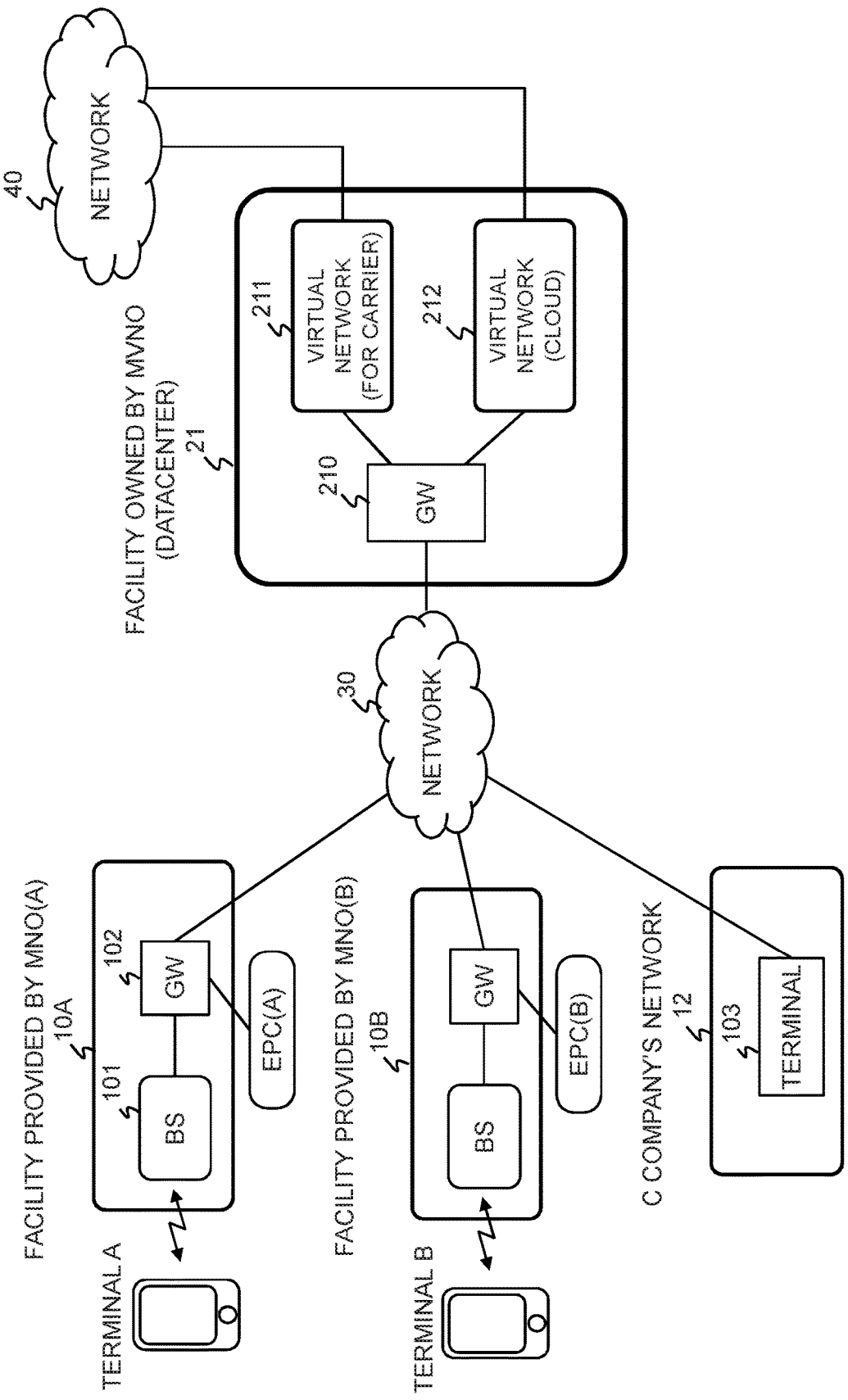
FIG. 7 is a network diagram showing the schematic architecture of a communication system according to a second exemplary embodiment of the present invention.

As illustrated in FIG. 7, a communication system according to the present exemplary embodiment includes a plurality of wireless communication facilities (10A, 10B), a network facility 12 to which a terminal of a virtual application user is connected, a datacenter 21, and a network 30 connecting the plurality of wireless communication facilities and network facility 12 to the datacenter 21. Here, it is assumed that different MNO(A) and MNO(B) own the wireless communication facilities 10A and 10B, respectively, another carrier (C company) owns the network facility 12, and an MVNO owns the datacenter 21. Note that a wireless communication facility 11 owned by the MVNO may be connected to the datacenter 21 via the network 30, as in the first exemplary embodiment.

The wireless communication facility 10A is part of the access network of a mobile communication network owned by the MNO(A) and is assumed to include at least a base station 101 and a gateway 102. Although one base station 101 is depicted here, an access network may be constructed, including a plurality of base stations 101 (e.g., eUTRAN (Evolved Universal Terrestrial Radio Network). Moreover, the MNO(A) also owns a core network EPC(A), and access from a terminal A here can be offloaded by the gateway 102 or can be forwarded to the datacenter 21 via the core network EPC(A) of the MNO(A) as well. The base station 101 performs wireless communication with the terminal A of a subscriber to the MNO(A), and the gateway 102 connects to the datacenter 21 via the network 30. It is assumed that the wireless communication facility 10B basically has a similar configuration.

The network facility 12 owned by C company can allow a terminal 103 to connect to the network 30. The terminal 103 connects to the datacenter 21 via the network 30, thus becoming able to receive a cloud service.

The datacenter 21 has a computing resource such as a computer and is connected to the network 30 via a gateway 210, and further a plurality of virtual networks connected to the gateway 210 are constructed within it independently of each other. Here, a virtual network 211 is the virtual core network implementing core network functions, and a virtual network 212 is an enterprise network for cloud computing. The virtual network 212 is provided for each corporate user. Note that the virtual core network 211 and the virtual network 212 may be constructed by using resources such as, for example, a virtual machine, a switch, and a router configured on a physical server.

Preferably, the gateway 210 forms a dedicated physical channel, or a protected logical channel passing over the network 30, with the gateway 102 of each wireless communication facility. Thereby, the base station of each wireless communication facility and the virtual network 211 or 212 can be connected, and the virtual network 211 is thus able to accommodate the radio access networks of the different MNOs.

Moreover, in the present exemplary embodiment, it is assumed that the user of the terminal 103 has signed a contract for a cloud service provided by the virtual network 212, whereby the terminal 103 can access the virtual network 212 for cloud computing via the network facility 12 and the network 30. For example, if the user of the terminal 103 is a subscriber to the MNO(A), the terminal 103 can access the virtual network 212 via the wireless communication facility 10A, or also can access the virtual network 212 via a network 40 by connecting to the virtual network 211.

The network 30 is an IP network such as the Internet, a RAN (Radio Access Network), or the like that connects the wireless communication facilities 10A, 10B and network facility 12 to the datacenter 21. Moreover, the network 40 connected to the virtual networks 211 and 212 is an external packet network or an IP network such as the Internet.

2.2) Datacenter

Next, a system will be described as an example in which a virtual core network (vEPC) for a carrier, as the virtual network 211, and an enterprise network for proving a cloud service such as IaaS or PaaS, as the virtual network 212, are constructed within a datacenter.

Fourth Example

Figure 8:
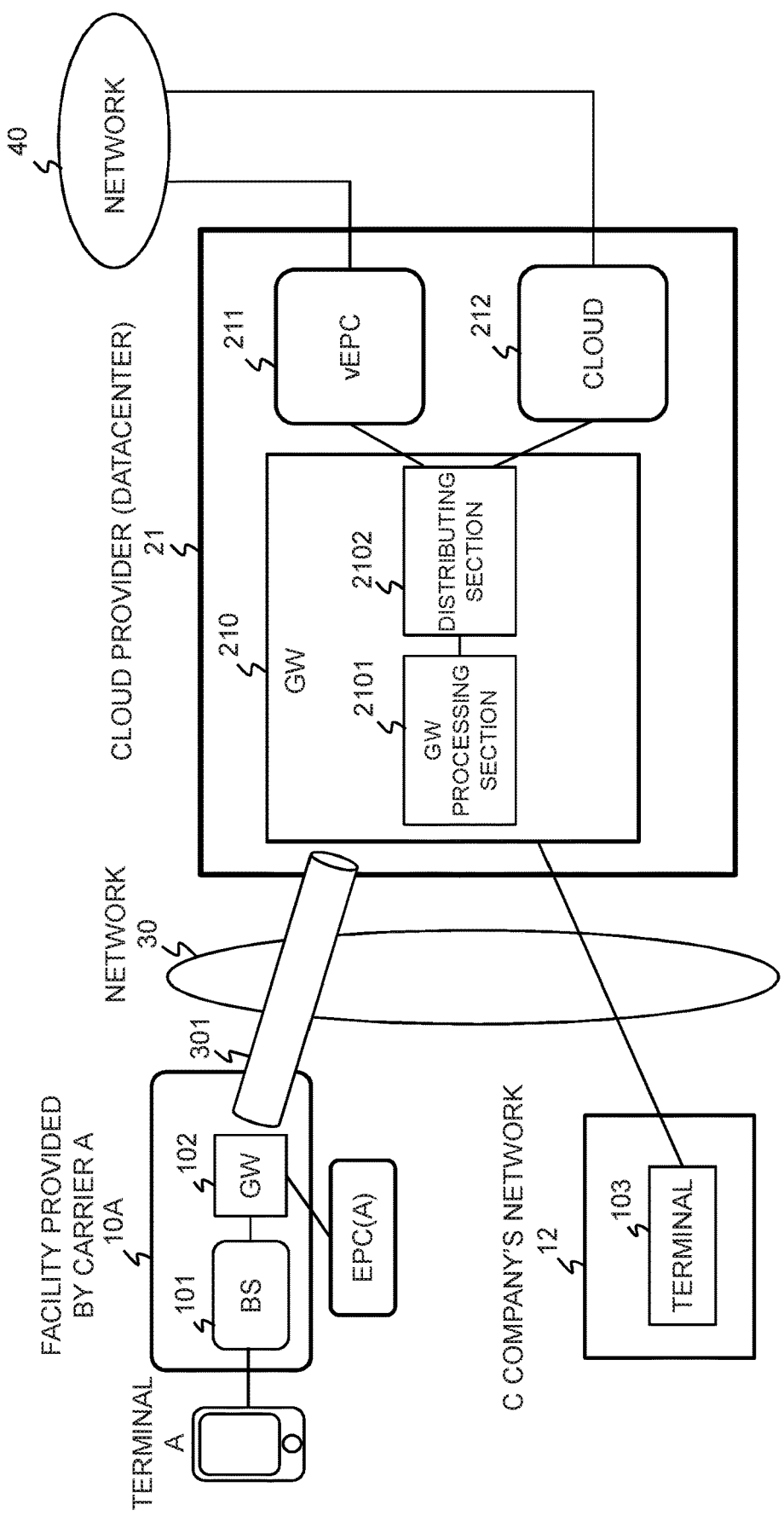
FIG. 8 is a network diagram showing the schematic architecture of a communication system according to a fourth example of the present invention.

As illustrated in FIG. 8, in a communication system according to a fourth example of the present invention, the vEPC 211 and the cloud 212 are constructed within the datacenter 21 of the cloud provider (MVNO), and the vEPC 211 and the cloud 212 are connected to the external network 40 and also connected to the network 30 via the gateway 210. The vEPC 211 and the cloud 212 operate on a computing resource (physical server, virtual server, virtual machine, or the like) within the datacenter 21 owned by the MVNO.

The gateway 210 includes a gateway processing section 2101 and a distributing section 2102, and the distributing section 2102 divides and distributes traffic for carrier and traffic of cloud users to the vEPC 211 and the cloud 212, respectively. The distributing of traffic by the distributing section 2102 can be performed per network or per communication facility, based on the identification of a source network ID, a destination, and/or a bearer or tunnel as described above. For example, the network ID or the identification of a tunnel can be performed by referring to part of a packet, or to an identifier indicating a network, user, service, or the like included in a packet, or alternatively to an input port number. Hereinafter, operation in the fourth example will be described with reference to FIGS. 9 and 10.

Figure 9:
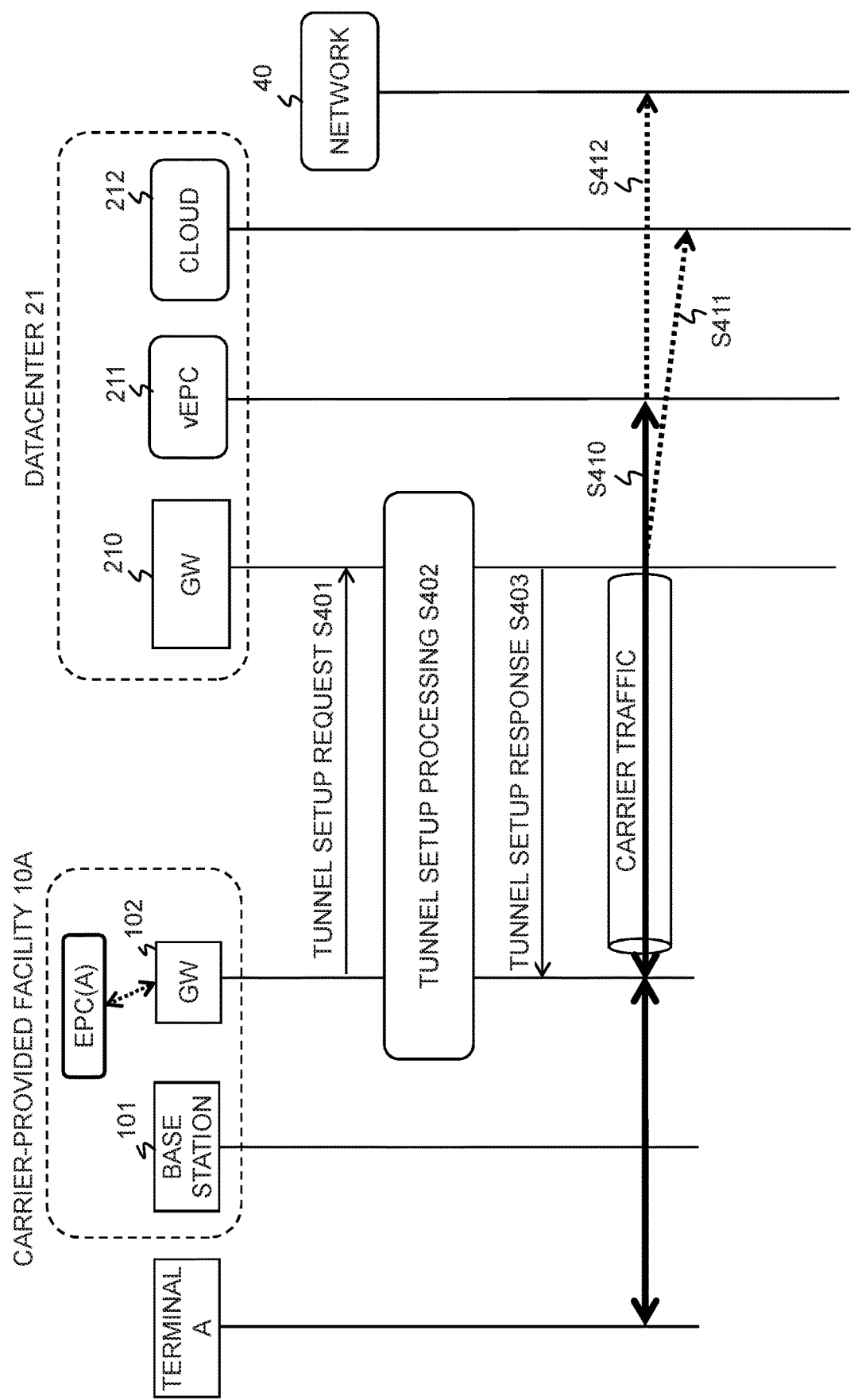
FIG. 9 is a sequence chart showing an example of operation in the communication system according to the fourth example.

Referring to FIG. 9, the wireless communication facility 10A provided by the carrier A includes the base station 101 and the gateway 102 as described above, and the gateway 101 terminates a tunnel between itself and the gateway 210 of the datacenter 21. It is assumed that the gateway 210 includes the gateway processing section 2101 and the distributing section 2102 as described above. Moreover, the carrier A also owns the core network EPC(A), and access from the terminal A here can be offloaded by the gateway 102 or can be forwarded to the datacenter 21 via the core network EPC(A) of the carrier A as well.

When a tunnel is set up between the gateway 102 of the carrier-provided facility 10A and the gateway 210 of the datacenter 21 through a predetermined procedure (Operations S401 to S403) as illustrated in FIG. 9, the terminal A becomes able to access the vEPC 211 or cloud 212 within the datacenter 21 through this tunnel.

For example, traffic for carrier offloaded by the gateway 102 is distributed to the vEPC 211 by the distributing section 2102 of the gateway 210 (Operation S410). Moreover, when traffic for carrier from the terminal A is addressed to the cloud 212 and passes through the core network EPC(A) of the carrier A, the distributing section 2102 of the gateway 210 distributes this traffic directly to its destination, the cloud 212 (Operation S411).

Furthermore, it is also possible that only part of the functions of the core network EPC(A) is constructed in the vEPC 211 and the core network EPC(A) is used for the rest of the functions. For example, when traffic for carrier from the terminal A passes through part of the functions of the core network EPC(A) of the carrier A, the distributing section 2102 of the gateway 210 distributes this traffic for carrier to the vEPC 211, whereby it is possible to have the traffic pass through the other EPC functions, and then send it to the network 40 (Operation S412).

Figure 10:
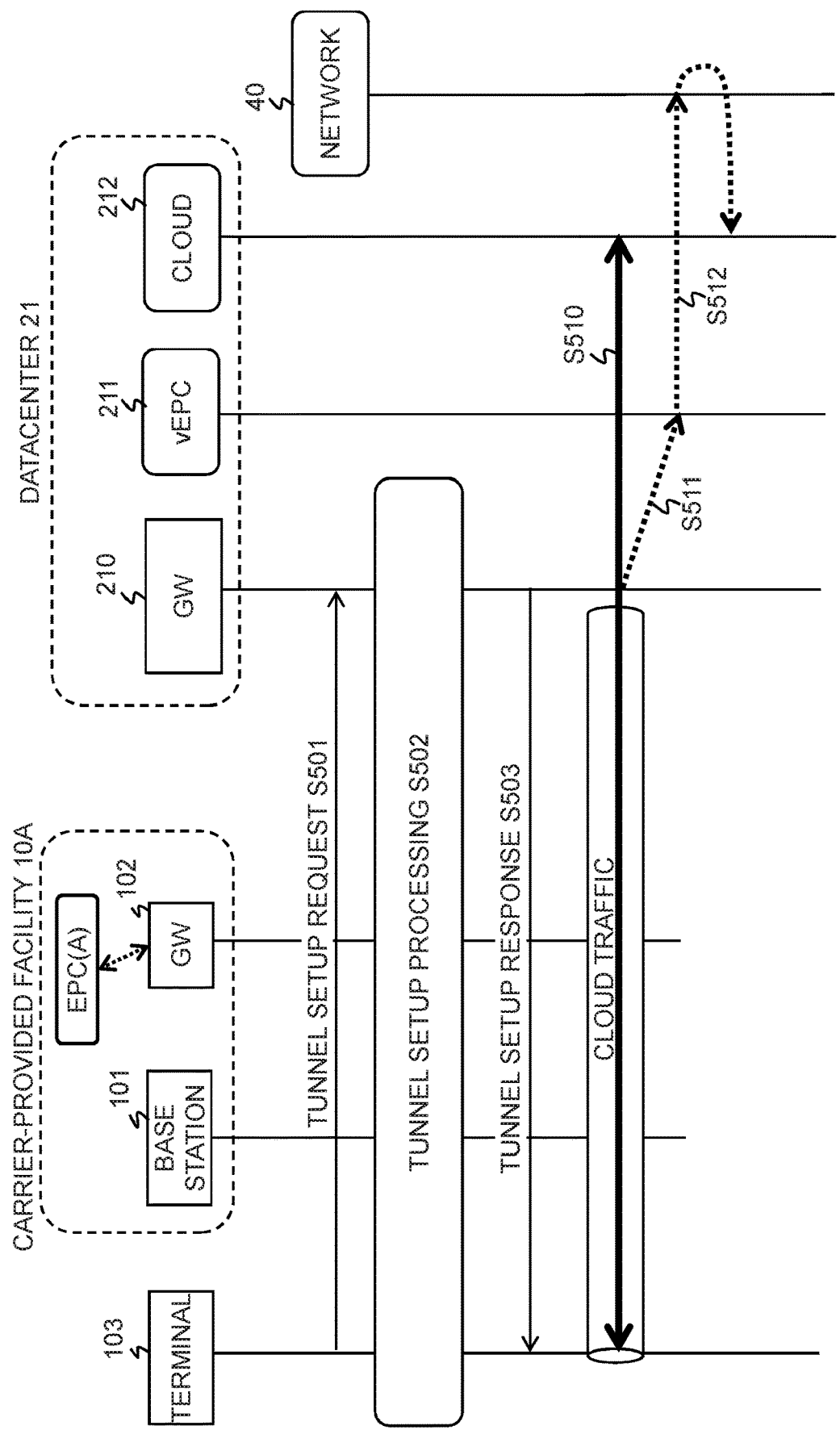
FIG. 10 is a sequence chart showing another example of operation in the communication system according to the fourth example.

As illustrated in FIG. 10, when a tunnel is set up between the terminal 103 that has connected to the network 30 through the network facility 12 owned by C company and the gateway 210 of the datacenter 21 through a predetermined procedure (Operations S501 to S503), the terminal 103 becomes able to access the cloud 212 through this tunnel via the vEPC 211 within the datacenter 21 or directly.

For example, traffic for cloud computing is directly distributed to the cloud 212 by the distributing section 2102 of the gateway 210 (Operation S510). Moreover, when access is made to the cloud 212 via EPC, traffic for cloud computing is distributed to the vEPC 211 by the distributing section 2102 of the gateway 210 (Operation S511) and forwarded to the cloud 212 from the vEPC 211 via the network 40 (Operation S512).

Next, examples of the path of traffic in the system shown in FIG. 8 will be described with reference to FIGS. 11 and 12.

Figure 11:
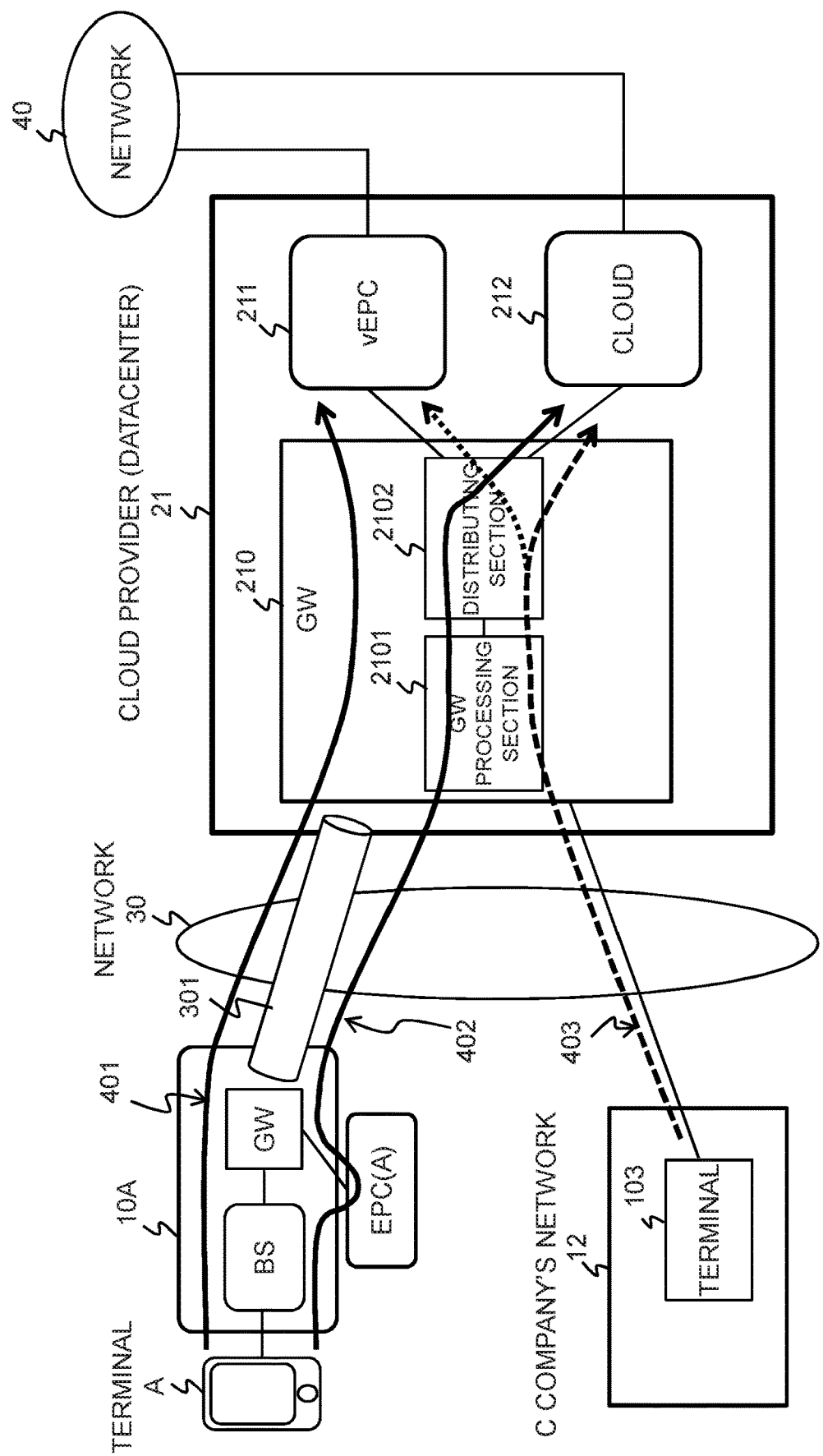
FIG. 11 is a schematic network diagram showing an example of operation in the communication system according to the fourth example.

FIG. 11 illustrates several paths of traffic in the present example. When traffic from the terminal A is offloaded by the gateway 102, this traffic is forwarded to the vEPC 211 in the datacenter 21 through a path 401. For example, when the source of traffic is the radio access network of the carrier A, the distributing section 2102 forwards this traffic to the vEPC 211.

Moreover, when traffic from the terminal A to the cloud 212 is forwarded to the EPC(A) of the carrier A without being offloaded, this traffic is forwarded to the cloud 212 in the datacenter 21 through a path 402. For example, when the source of traffic is the EPC(A) of the carrier A and the destination thereof is the cloud 212, the distributing section 2102 forwards this traffic to the cloud 212.

Note that when traffic whose destination is the cloud 212 is offloaded by the gateway 102, this traffic is forwarded to the vEPC 211 in the datacenter 21 through the path 401 and then forwarded to the cloud 212 via the network 40.

Furthermore, when the terminal 103 of a cloud user accesses the cloud 212 by using the network facility 12 owned by C company, traffic from the terminal 103 is forwarded to the cloud 212 in the datacenter 21 through a path 403. For example, when the source of traffic is C company's network 12 and the destination thereof is the cloud 212, the distributing section 2102 forwards this traffic to the cloud 212.

Figure 12:
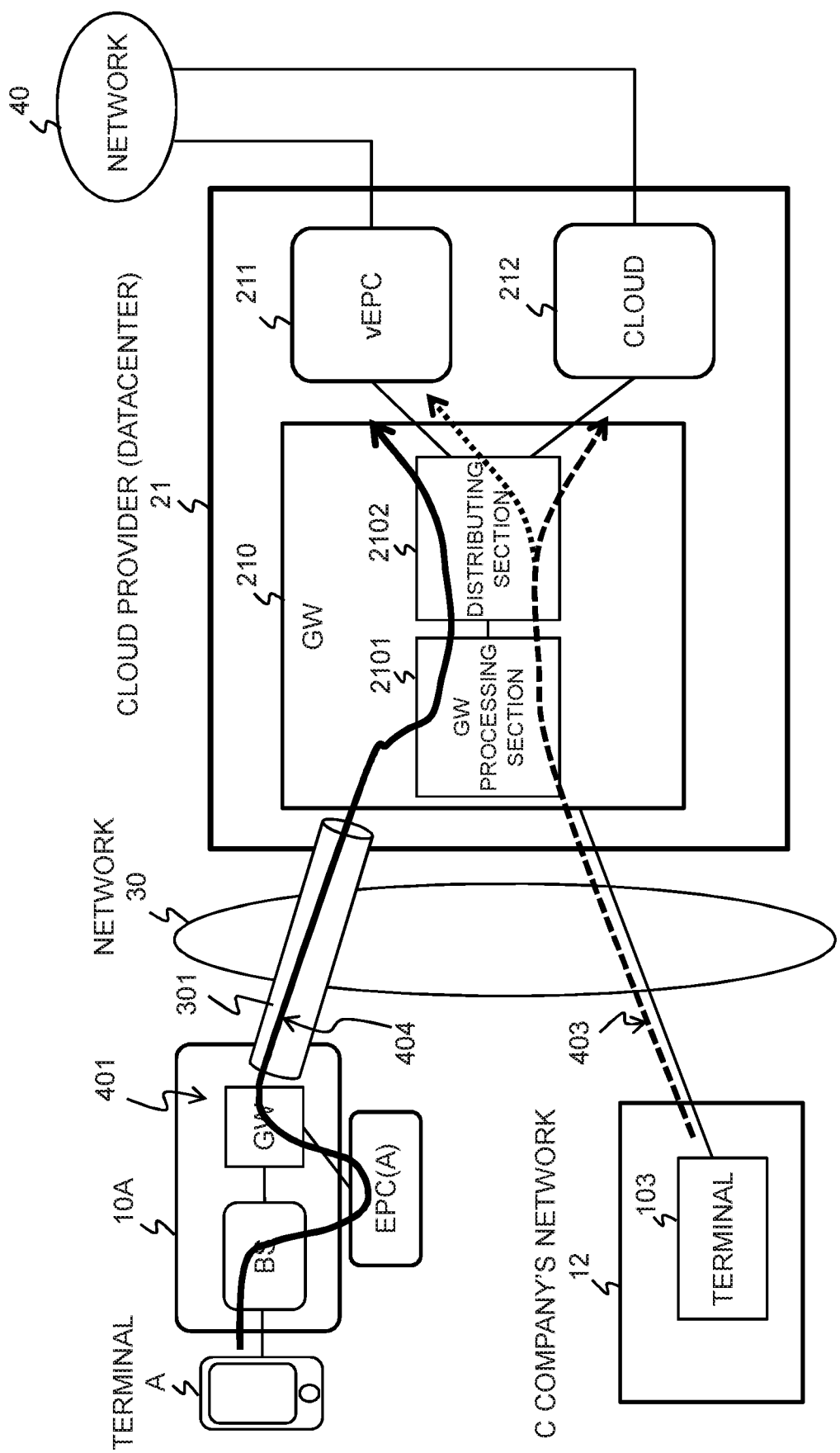
FIG. 12 is a schematic network diagram showing another example of operation in the communication system according to the fourth example.

Further, as shown in FIG. 12, it is also possible that traffic travels via both the EPC(A) and the vEPC 211 like a path 404. In this case, the vEPC 211 in the datacenter 21 only has part of the functions constituting an EPC, and functions of the EPC(A) of the carrier A are virtually used for the rest of the functions. For example, when the vEPC 211 only has P-GW function and HSS function, functions up to S-GW of the EPC(A) are used. Alternatively, when the vEPC 211 only has accounting function and customer information and authentication function, S-GW, P-GW and HSS of the EPC(A) are used. As described above, such a configuration is also possible that implements the functions of a core network by passing through both the EPC(A) owned by the carrier A and the vEPC 211 within the datacenter 21. In this case, the EPC(A) is shared by the carrier A, which is an MNO, and the cloud provider, which is an MVNO, and used in a physically or virtually separated manner via the network.

Note that in the fourth example, a bearer termination section may be provided to the datacenter 21 as in the first example shown in FIG. 3. Alternatively, a tunnel termination section can also be provided to the gateway 210 as in the second example shown in FIG. 4.

2.3) Effects

As described above, according to the second exemplary embodiment of the present invention, a virtual core network for a carrier and a virtual network for providing a cloud service to users are independently constructed within a datacenter, and traffic is distributed to either the virtual core network or the virtual network, whereby it is possible to enhance the versatility of the datacenter and thus to achieve the efficient use of the virtual network.

3. Third Exemplary Embodiment

According to a third exemplary embodiment of the present invention, virtual networks of a plurality of different MVNOs are constructed within a datacenter independently of each other. Further, a distributing means is provided within the datacenter, whereby traffic from terminals of subscribers to the MVNOs are distributed to the respectively corresponding virtual networks.

Figure 13:
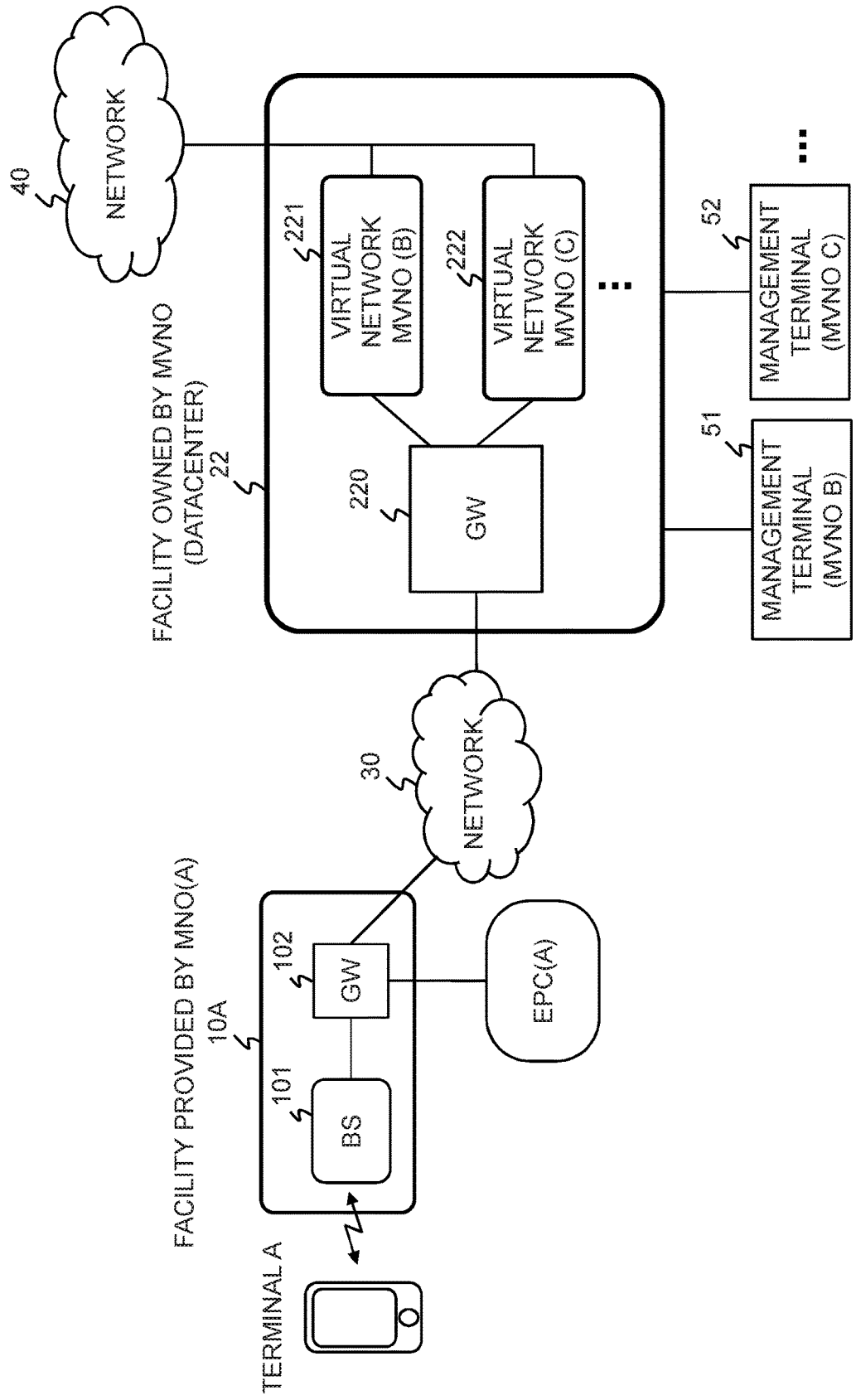
FIG. 13 is a network diagram showing the schematic architecture of a communication system according to a third exemplary embodiment of the present invention.

As illustrated in FIG. 13, a communication system according to the present exemplary embodiment includes a wireless communication facility 10A, a datacenter 22, and a network 30 connecting the wireless communication facility 10A and the datacenter 22. Here, it is assumed that an MNO A owns the wireless communication facility 10A, and an MVNO owns the datacenter 22.

The wireless communication facility 10A is part of the access network of a mobile communication network owned by the MNO(A) and is assumed to include at least a base station 101 and a gateway 102. Although one base station 101 is depicted here, an access network including a plurality of base stations 101 (e.g., eUTRAN (Evolved Universal Terrestrial Radio Network)) may be constructed. Moreover, the MNO(A) also owns a core network EPC(A), and access from a terminal A here can be offloaded by the gateway 102 or can be forwarded to the datacenter 22 via the core network EPC(A) of the MNO (A) as well. The base station 101 performs wireless communication with a terminal of a subscriber to the MNO(A) or a terminal of a subscriber to an MVNO that has made an agreement to use the wireless communication facility 10A. The gateway 102 connects to the datacenter 22 via the network 30.

The datacenter 22 has a computing resource such as a computer and is connected to the network 30 via a gateway 220, and further a plurality of virtual networks (221, 222, . . . ) connected to the gateway 220 are constructed within it independently of each other. Here, it is assumed that the virtual networks 221 and 222 are operated by MVNOs B and C, respectively, and that the MVNOs B and C manage the virtual core networks 221 and 222 via external management terminals 51 and 52, respectively. Note that each virtual network (221, 222) within the datacenter 22 can be constructed by using resources such as, for example, a virtual machine, a switch, and a router constructed on a physical server.

Preferably, the gateway 220 forms a dedicated physical channel, or a protected logical channel passing over the network 30, with the gateway 102 of the wireless communication facility 10A. Thereby, the respective base stations of a plurality of wireless communication facilities and the virtual network 221 or 222 can be independently connected, and, for example, the virtual network 221 or 222 is thus able to accommodate the radio access networks of the different MNOs.

The network 30 is an IP network such as the Internet, a RAN (Radio Access Network), or the like that connects the wireless communication facility 10A to the datacenter 22. Moreover, a network 40 connected to the virtual networks 221 and 222 is an external packet network or an IP network such as the Internet.

Fifth Example

Next, a system will be described as an example in which the wireless communication facility 10A is owned by the MNO (carrier) A, and the virtual core network vEPC(B) 221 of the MVNO B and the virtual core network vEPC(C) 222 of the MVNO C are constructed within the datacenter 22.

Figure 14:
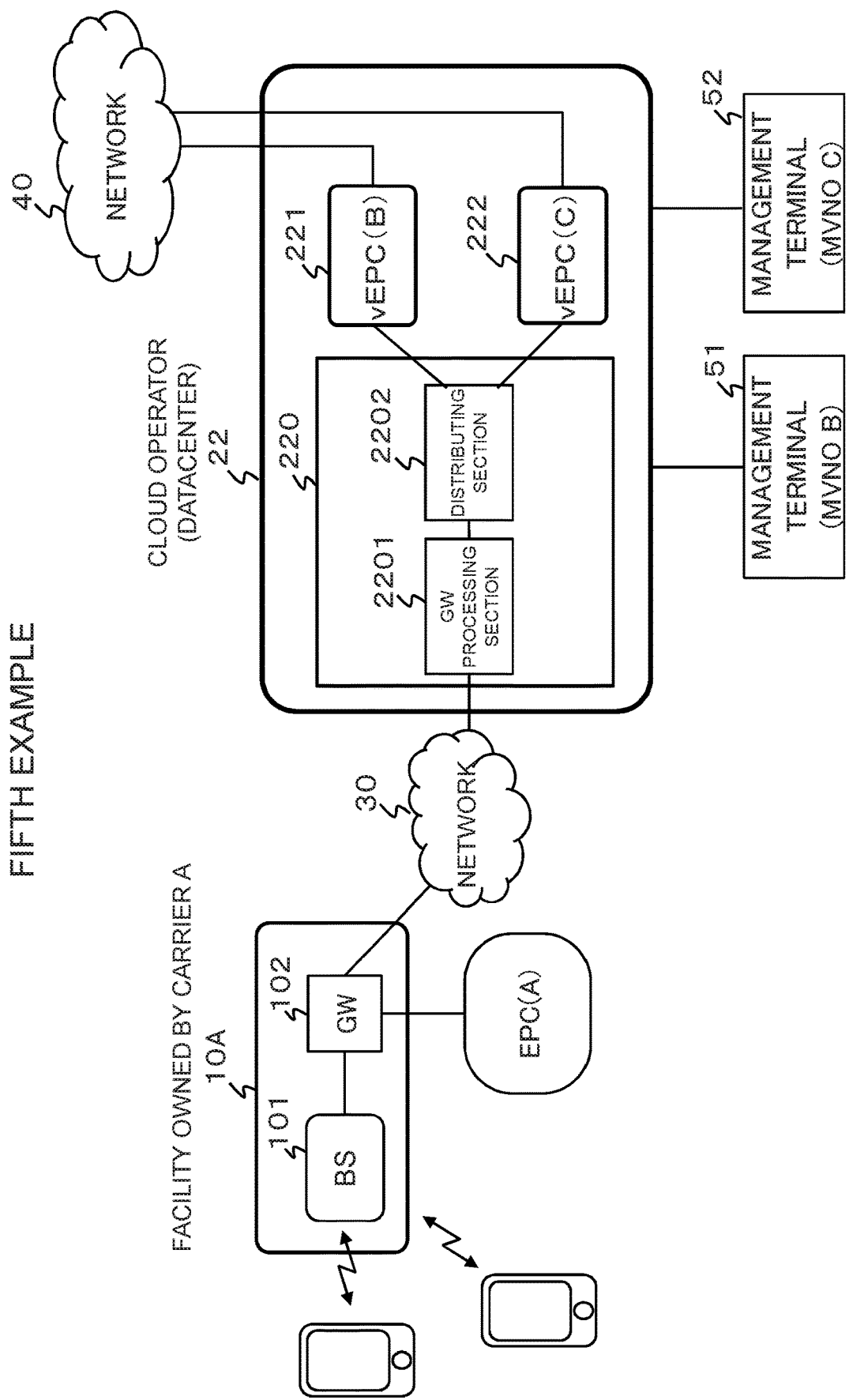
FIG. 14 is a network diagram showing the schematic architecture of a communication system according to a fifth example of the present invention.

As illustrated in FIG. 14, in the communication system according to a fifth example of the present invention, the vEPC(B) 221 and vEPC(C) 222 are constructed within the datacenter 22 of the cloud provider (MVNO). The vEPC(B) 221 and vEPC(C) 222 operate on computing resource (physical server, virtual server, virtual machine, or the like) within the datacenter 22 owned by the MVNO. The vEPC (B) 221 and vEPC(C) 222 are connected to the external network 40, and also connected to the network 30 via the gateway 220.

In the present example, it is assumed that the vEPC(B) 221 constructs only part of the functions of the core network EPC(A) of the carrier A, and the core network EPC(A) is used for the rest of the functions. Similarly, it is assumed that the vEPC(C) 222 also constructs only part of the functions of the core network EPC(A) of the carrier A, and the core network EPC(A) is used for the rest of the functions. However, as described already, one or both of the vEPC(B) 221 and vEPC(C) 222 may be a virtual core network having all of the functions of the core network EPC(A).

The gateway 220 includes a gateway processing section 2201 and a distributing section 2202, and the distributing section 2202 distributes traffic from a terminal to the vEPC 221 or vEPC 222 corresponding to this traffic. The distributing of traffic by the distributing section 2202 can be performed per network or per communication facility, based on the identification of a source network ID, a destination, and/or a bearer or tunnel as described above. For example, the identification of a network ID or tunnel can be performed by referring to part of a packet, or to an identifier indicating a network, user, service, or the like included in a packet, or to an input port number. Hereinafter, operation in the fifth example will be described with reference to FIGS. 15 and 16.

Figure 15:
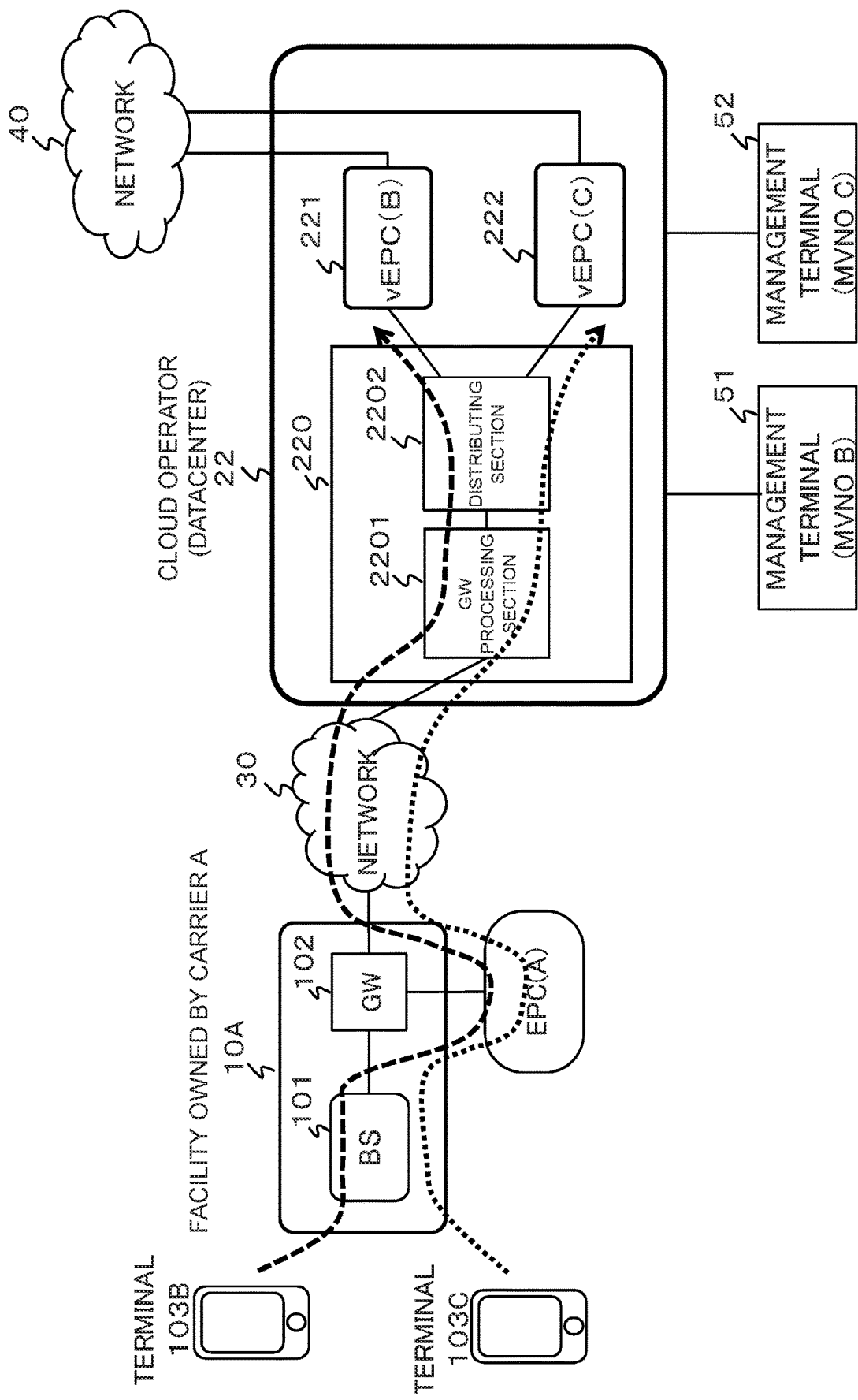
FIG. 15 is a schematic network diagram showing an example of operation in the communication system according to the fifth example.

As illustrated in FIG. 15, traffic from a terminal 103B of a subscriber to the MVNO B is forwarded to the datacenter 22 via the EPC(A) of the carrier A and distributed to the vEPC(B) 221 by the distributing section 2202 of the gateway 220. Moreover, traffic from a terminal 103C of a subscriber to the MVNO C is forwarded to the datacenter 22 via the EPC(A) of the carrier A and distributed to the vEPC(C) 222 by the distributing section 2202 of the gateway 220. For example, when the source and destination of traffic that has traveled through a tunnel with the wireless communication facility 10A of the carrier A is the terminal 103B and the network 40, respectively, then the distributing section 2202 forwards this traffic to the vEPC(B) 221. Note that even if traffic is offloaded by the gateway 102 and does not pass through the EPC(A), the traffic is similarly forwarded to a corresponding vEPC within the datacenter 22.

Figure 16:
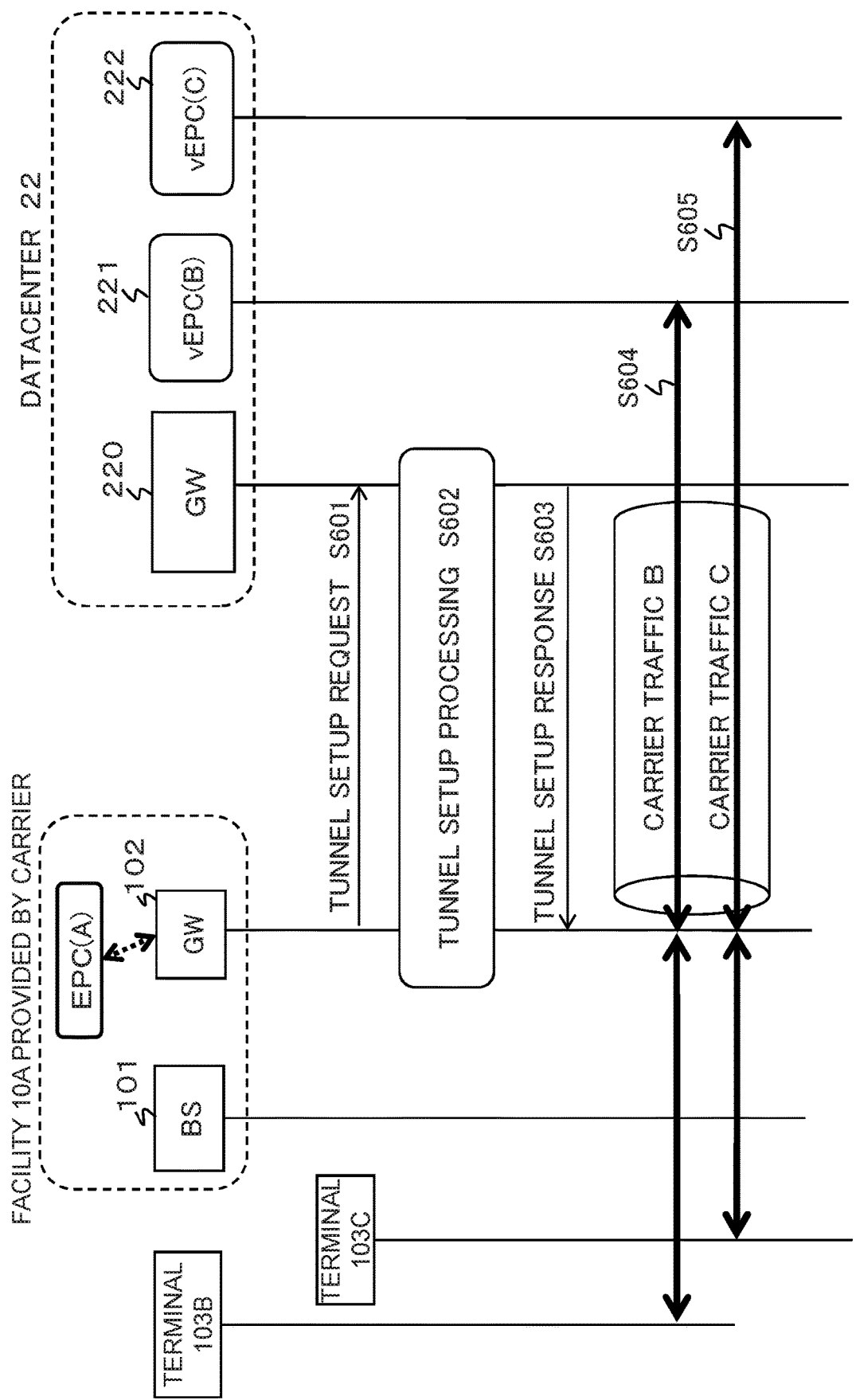
FIG. 16 is a sequence chart showing an example of operation in the communication system according to the fifth example.

Referring to FIG. 16, the wireless communication facility 10A provided by the carrier A includes the base station 101, the gateway 102, and the EPC(A) as described above, and the gateway 101 terminates a tunnel between itself and the gateway 220 of the datacenter 22. It is assumed that the gateway 220 includes the gateway processing section 2201 and the distributing section 2202 as described above. Moreover, the carrier A also owns the core network EPC(A), and it is assumed that access from the terminal A here is forwarded to the datacenter 22 via the core network EPC(A) of the carrier A.

When a tunnel is set up between the gateway 102 of the carrier-provided facility 10A and the gateway 210 of the datacenter 22 through a predetermined procedure as illustrated in FIG. 16 (Operations S601 to S603), each of the terminals 103B and 103C becomes able to access the vEPC(B) 221 or vEPC(C) 222 within the datacenter 22 through this tunnel (Operation S604, S605).

When traffic for carrier from the terminal 103B passes through part of the functions of the core network EPC(A) of the carrier A, the distributing section 2202 of the gateway 220 distributes this traffic for carrier to the vEPC(B) 221, whereby it is possible to have the traffic pass through the other EPC functions and then send it to the network 40.

Similarly, when traffic for carrier from the terminal 103C passes through part of the functions of the core network EPC(A) of the carrier A, the distributing section 2202 of the gateway 220 distributes this traffic for carrier to the vEPC(C) 222, whereby it is possible to have the traffic pass through the other EPC functions and then send it to the network 40.

For example, if the vEPC(B) 221 in the datacenter 22 only has part of the functions constituting an EPC, functions of the EPC(A) of the carrier A are virtually used for the rest of the functions. As an example, if the vEPC 221 only has P-GW function and HSS function, functions up to S-GW of the EPC(A) are used. Alternatively, if the vEPC 221 only has accounting function and customer information and authentication function, then S-GW, P-GW and HSS of the EPC(A) are used. As described above, the functions of a core network are implemented by passing through both the EPC(A) owned by the carrier A and the vEPC 221 within the datacenter 22. In this case, the EPC(A) is shared by the carrier A, which is an MNO, and the cloud provider, which is an MVNO, and used in a physically or virtually separated manner via the network. The same applies to the EPC(A) of the carrier A and the vEPC(C) 222.

Note that in the fifth example, a bearer termination section may be provided to the datacenter 22 as in the first example shown in FIG. 3. Alternatively, a tunnel termination section can also be provided to the gateway 220 as in the second example shown in FIG. 4.

Sixth Example

According to a sixth example of the present invention, a plurality of virtual core networks are constructed within a datacenter as in the fifth example, but each virtual core network can use facilities provided by a plurality of MNOs. That is, each of the virtual core networks within the datacenter can process traffic from the plurality of MNOs' communication facilities.

Figure 17:
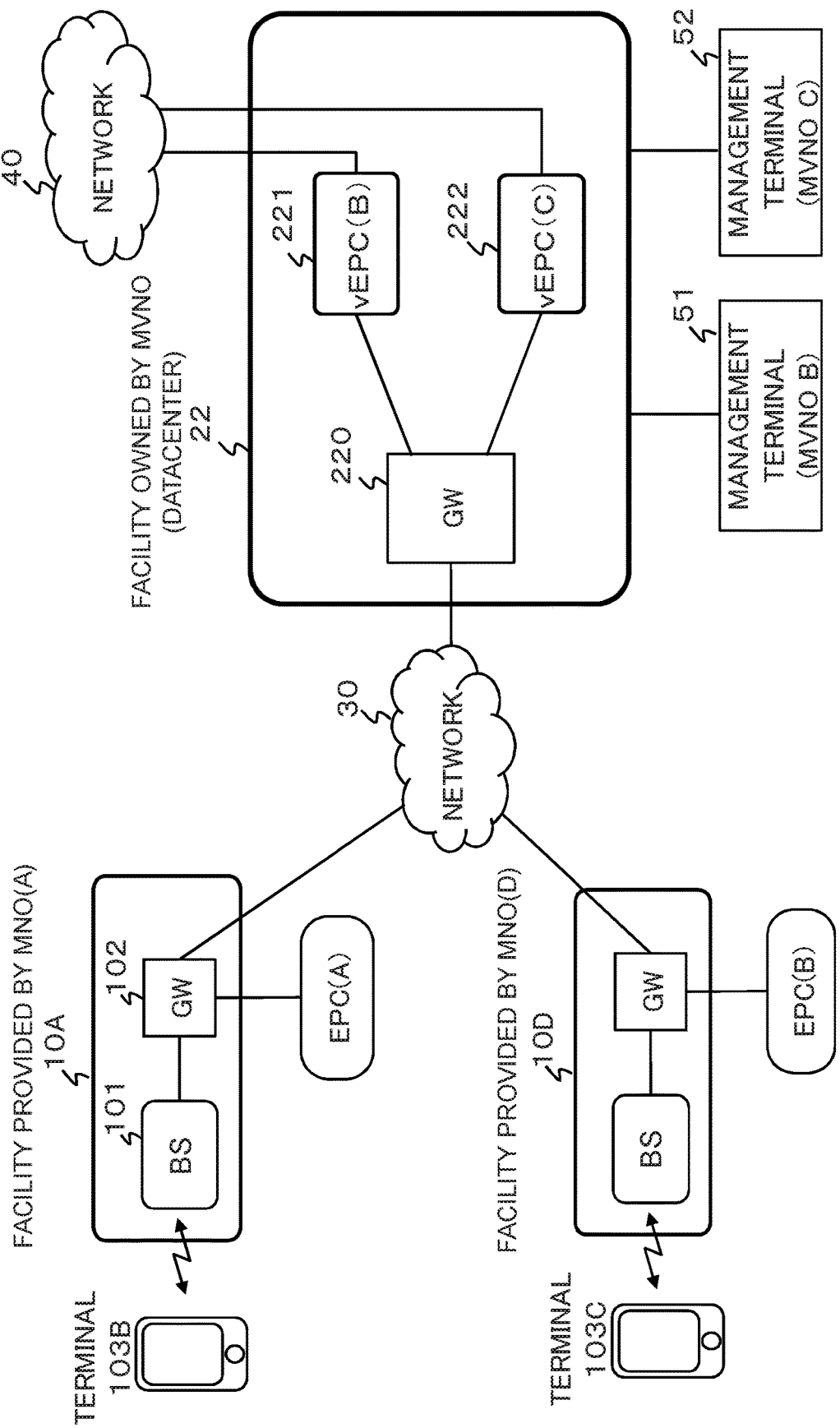
FIG. 17 is a network diagram showing the schematic architecture of a communication system according to a sixth example of the present invention.

As illustrated in FIG. 17, a communication system according to the sixth example includes wireless communication facilities 10A and 10D owned by different MNOs A and D, respectively, the datacenter 22, and the network 30. The datacenter 22 owned by the MVNO is similar to that of the fifth example, and therefore a detailed description thereof will be omitted by giving the same reference signs to the respective blocks. Hereinafter, operation in the communication system according to the sixth example will be described with reference to FIG. 18.

Figure 18:
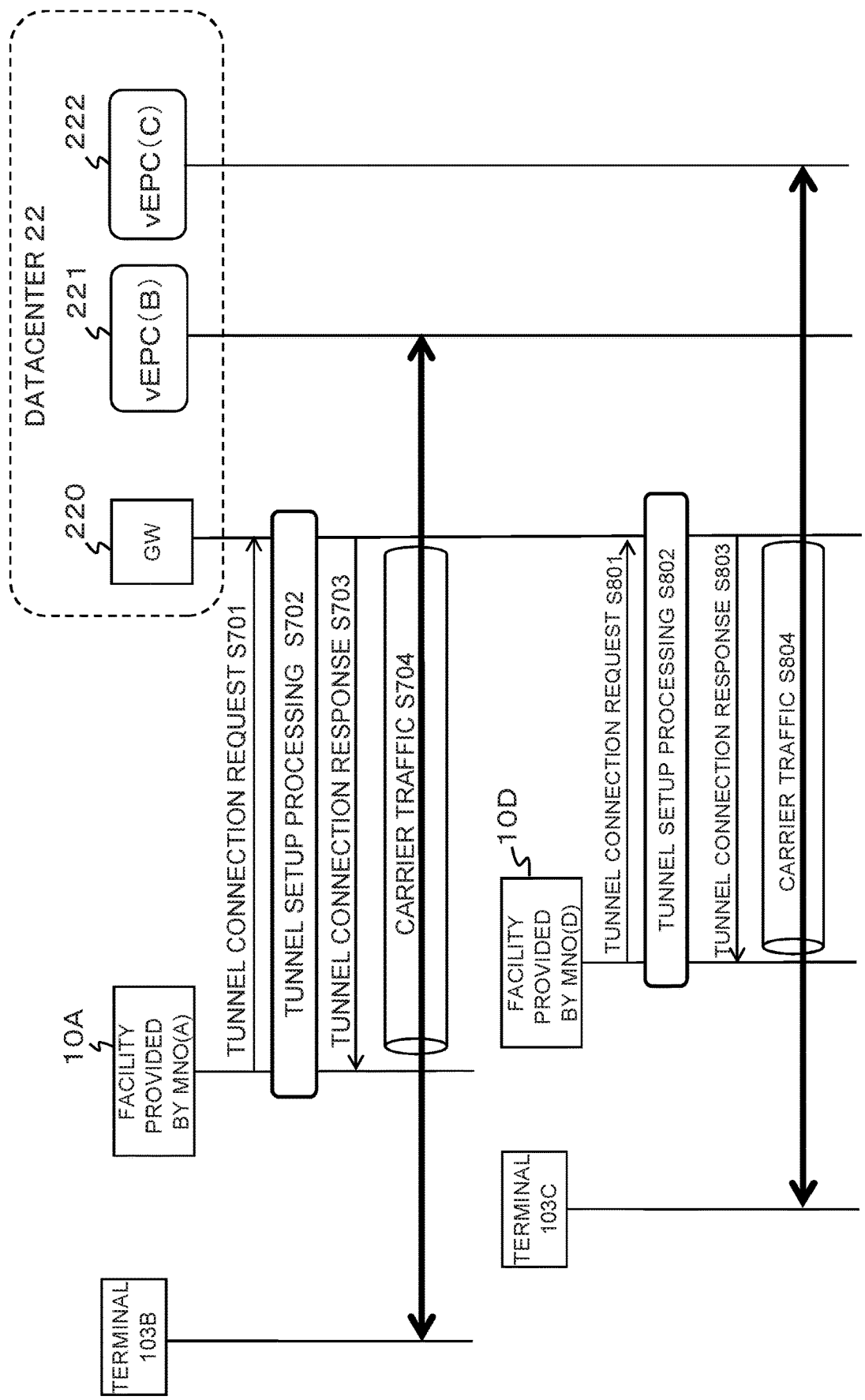
FIG. 18 is a sequence chart showing an example of operation in the communication system according to the sixth example.

Referring to FIG. 18, it is assumed that the facility 10A provided by the MNO A includes the base station 101 and the gateway 102 as described above, and that the gateway 220 of the datacenter 22 includes the gateway processing section 2201 and the distributing section 2202 as described above. Moreover, the MNO A owns the core network EPC(A), and it is assumed that only part of the functions of the core network EPC(A) is constructed in each of the vEPC(B) 221 and vEPC(C) 222 in the datacenter 22.

When a tunnel is set up between the gateway 102 of the carrier-provided facility 10A and the gateway 220 of the datacenter 22 through a predetermined procedure as illustrated in FIG. 18 (Operations S701 to S703), traffic for carrier from the terminal 103B is forwarded, via part of the functions of the core network EPC(A), to the gateway 220 of the datacenter 22 through the tunnel. The distributing section 2102 of the gateway 220 distributes this traffic for carrier to the vEPC(B) 221 based on a source address, network ID, or the like (Operation S704). Thus, the traffic from the terminal 103B passes through the EPC functions of the core network EPC(A) and the EPC functions of the vEPC(B) 221 and then is sent to the network 40.

Similarly, when a tunnel is set up between the gateway 102 of the carrier-provided facility 10D and the gateway 220 of the datacenter 22 through a predetermined procedure (Operations S801 to S803), traffic from the terminal 103C is also let through part of the functions of a core network EPC(D), forwarded to the gateway 220 of the datacenter 22 through the tunnel, and distributed to the vEPC(C) 222 (Operation S804). Thus, the traffic from the terminal 103C passes through the EPC functions of the core network EPC(C) and the EPC functions of the vEPC(C) 222 and then is sent to the network 40.

As described above, according to the third exemplary embodiment of the present invention, virtual networks of a plurality of different MVNOs are constructed within a datacenter independently of each other, and traffic from terminals of subscribers to the MVNOs are distributed to the corresponding virtual networks, whereby it is possible to enhance the versatility of the datacenter and thus to achieve the efficient use of virtual networks.

4. Fourth Exemplary Embodiment

According to a fourth exemplary embodiment of the present invention, virtual networks of a plurality of MVNOs are constructed within a datacenter as in the second exemplary embodiment, and a virtual network of another MVNO is further constructed within the virtual network resource of one of the MVNOs. In other words, an MVNO having a virtual network resource within a datacenter leases part of it out for a virtual network of another MVNO, whereby the more versatile and efficient use of the datacenter is possible.

As illustrated in FIG. 19, in a communication system according to the present exemplary embodiment, within a datacenter 23 of a cloud provider (MVNO), a cloud 231 and a virtual network 232 of another VMNO B are constructed, and the cloud 231 and the virtual network 232 are connected to an external network 40 and also connected to a network 30 via a gateway 230. The cloud 231 and the virtual network 232 operate on computing resource (physical server, virtual server, virtual machine, or the like) within the datacenter 23 owned by the MVNO.

The gateway 230 has functions similar to the gateway processing section 2101 and the distributing section 2102 as described in the fourth example (FIG. 8), and the distributing section distributes traffic for carrier and traffic of cloud users to the cloud 231 or the virtual network 232. The distributing of traffic by the distributing section can be performed per network or per communication facility, based on the identification of a source network ID, a destination, and/or a bearer or tunnel as described above. For example, the identification of a network ID or tunnel can be performed by referring to part of a packet, or to an identifier indicating a network, user, service, or the like included in a packet, or alternatively to an input port number.

According to the present exemplary embodiment, a gateway 240, a vEPC(B) 241, which is a virtual network of the MVNO(B), and a vEPC(C) 242, which is a virtual network of another MVNO C, are further constructed in the virtual network 232 of the MVNO(B). In other words, the vEPC(B) 241 and the vEPC(C) 242 are physically or virtually separated, whereby the network 232 of the MVNO(B) is shared by the MVNO(B) and the MVNO(C). Accordingly, in the present exemplary embodiment, viewed from the MVNO (C), a facility 10A of an MNO(A) becomes available through the intermediacy of the MVNO(B). Note that the configuration and operation within the virtual network 232 are as described in the sixth example, and therefore details thereof will be omitted.

INDUSTRIAL APPLICABILITY

The present invention can be applied to a communication system including a datacenter.

Application software in accordance with the present disclosure, such as computer programs executed by the device and may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

REFERENCE SIGNS LIST 10A, 10B Wireless communication facility of MNO
11 Wireless communication facility of MVNO
12 Communication facility of another carrier
20, 21, 22, 23 Datacenter
30, 40 Network
51, 52 Management terminal
101 Base station
102 Gateway
103 Terminal
201 Virtual core network (vEPC)
202 Gateway
203 Bearer termination section
210 Gateway
211 Virtual network for carrier
212 Virtual network for cloud computing
220 Gateway
221 Virtual network of MVNO(B)
222 Virtual network of MVNO(C)
230 Gateway
231 Virtual network for cloud computing
232 Virtual network of MVNO(B)
240 Gateway
241 Virtual core network of MVNO(B)
242 Virtual core network of MVNO(C)
301-303 Tunnel (virtual path)
401-403 Path of traffic
2021 Tunnel termination section
2022 Gateway processing section
2101 Gateway processing section
2102 Distributing section
2201 Gateway processing section
2202 Distributing section

The invention claimed is:

1. A communication system comprising:
a communication facility owned by at least one network operator; and
a datacenter connected to the communication facility over a network,
wherein the datacenter includes:
a first virtual network configured to be operated by a first mobile virtual network operator,
wherein the first virtual network is configured to implement core network functions of a first mobile core network of the first mobile virtual network operator;
a second virtual network configured to be operated by a second mobile virtual network operator,
wherein the second virtual network is configured to implement core network functions of a second mobile core network of the second mobile virtual network operator; and
a server configured to:
receive network traffic from a first user terminal and a second user terminal via the communication facility;
determine whether the network traffic is received from the first user terminal of the first mobile virtual network operator or the second user terminal of the second mobile virtual network operator;
distribute the network traffic from the first user terminal to the first virtual network in response to determining receipt of the network traffic from the first user terminal of the first mobile virtual network operator; and
distribute the network traffic from the second user terminal to the second virtual network in response to determining receipt of the network traffic from the second user terminal of the second mobile virtual network operator.

2. The communication system according to claim 1, wherein at least one of the first virtual network and the second virtual network is a virtual core network configured to implement mobile communication functions by using the communication facility.

3. The communication system according to claim 1, wherein at least one of the first virtual network and the second virtual network is a mobile virtual network configured to provide a cloud service.

4. The communication system according to claim 1, wherein the communication facility includes a core network of the at least one network operator which owns the communication facility.

5. The communication system according to claim 1, wherein the communication facility is a radio access network including at least one base station of the at least one network operator which owns the communication facility, or a communication network of another network operator.

6. The communication system according to claim 1, wherein the first virtual network includes the second virtual network.

7. The communication system according to claim 6, wherein the first virtual network includes:
a plurality of second virtual networks configured to be operated by a plurality of different virtual network operators, respectively; and
a second server configured to distribute traffic from the communication facility to any one of the second virtual networks.

8. A datacenter comprising:
a gateway that configured to connect to a communication facility owned by a network operator over a network;
a first virtual network configured to be operated by a first mobile virtual network operator,
wherein the first virtual network is configured to implement core network functions of a first mobile core network of the first mobile virtual network operator;

a second virtual network configured to be operated by a second mobile virtual network operator,
   wherein the second virtual network is configured to implement core network functions of a second mobile core network of the second mobile virtual network operator; and
a server configured to:
   receive network traffic from a first user terminal and a second user terminal via the communication facility;
   determine whether the network traffic is received from the first user terminal of the first mobile virtual network operator or the second user terminal of the second mobile virtual network operator;
   distribute the network traffic from the first user terminal to the first virtual network in response to determining receipt of the network traffic from the first user terminal of the first mobile virtual network operator; and
   distribute the network traffic from the second user terminal to the second virtual network in response to determining receipt of the network traffic from the second user terminal of the second mobile virtual network operator.

9. The datacenter according to claim 8, wherein at least one of the first virtual network and the second virtual network is a virtual core network configured to implement mobile communication functions by using the communication facility.

10. The datacenter according to claim 8, wherein at least one of the first virtual network and the second virtual network is a mobile virtual network configured to provide a cloud service.

11. The datacenter according to claim 8, wherein the communication facility includes a core network of the network operator which owns the communication facility.

12. The datacenter according to claim 8, wherein the server is configured to distribute the network traffic to a destination, using identification of a source network of the network traffic.

13. The datacenter according to claim 8, wherein the gateway includes a first gateway apparatus, and
   wherein the first gateway apparatus connects to the communication facility through a physical channel or a virtual channel over the network.

14. The datacenter according to claim 8, wherein the first virtual network includes the second virtual network.

15. The datacenter according to claim 14, wherein the first virtual network includes:
   a plurality of second virtual networks configured to be operated by a plurality of different mobile virtual network operators, respectively; and
   a second server configured to distribute traffic from the communication facility to any one of the second virtual networks.

16. A communication control method in a datacenter, the communication control method comprising:
   connecting the datacenter to a communication facility owned by a network operator over a network;
   constructing a first virtual network configured to be operated by a first mobile virtual network operator,
      wherein the first virtual network is configured to implement core network functions of a first mobile core network of the first mobile virtual network operator;
   constructing a second virtual network configured to be operated by a second mobile virtual network operator,
      wherein the second virtual network is configured to implement core network functions of a second mobile core network of the second mobile virtual network operator;
   receiving network traffic from a first user terminal and a second user terminal via the communication facility;
   determining whether the network traffic is received from the first user terminal of the first mobile virtual network operator or the second user terminal of the second mobile virtual network operator;
   distributing the network traffic from the first user terminal to the first virtual network in response to determining receipt of the network traffic from the first user terminal of the first mobile virtual network operator; and
   distributing the network traffic from the second user terminal to the second virtual network in response to determining receipt of the network traffic from the second user terminal of the second mobile virtual network operator.

17. The communication control method according to claim 16, wherein the first virtual network includes the second virtual network.

18. The communication control method according to claim 17, wherein the first virtual network includes a plurality of second virtual networks configured to be operated by a plurality of different mobile virtual network operators, respectively, and
   wherein the communication control method further comprises:
      receiving traffic from the communication facility; and
      distributing the received traffic from the communication facility to any one of the second virtual networks.

* * * * *